(12) United States Patent
Ding et al.

(10) Patent No.: US 11,384,299 B2
(45) Date of Patent: Jul. 12, 2022

(54) SYSTEMS AND PROCESSES FOR UPGRADING AND CONVERTING CRUDE OIL TO PETROCHEMICALS THROUGH STEAM CRACKING

(71) Applicant: Saudi Arabian Oil Company, Dhahran (SA)

(72) Inventors: Lianhui Ding, Dhahran Camp (SA); Alberto Lozano Ballesteros, Dhahran (SA); Ibrahim Al-Nutaifi, Dhahran (SA); Abdennour Bourane, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/720,240

(22) Filed: Dec. 19, 2019

(65) Prior Publication Data
US 2021/0189265 A1   Jun. 24, 2021

(51) Int. Cl.
*C10G 69/06* (2006.01)
*B01D 15/10* (2006.01)
(Continued)

(52) U.S. Cl.
CPC ............ *C10G 69/06* (2013.01); *B01D 3/143* (2013.01); *B01D 15/10* (2013.01); *B01J 8/0457* (2013.01);
(Continued)

(58) Field of Classification Search
None
See application file for complete search history.

(56) References Cited

U.S. PATENT DOCUMENTS

| 4,137,147 A | 1/1979 | Franck et al. |
| 4,422,960 A | 12/1983 | Shiroto et al. |

(Continued)

FOREIGN PATENT DOCUMENTS

| CA | 2488265 C | 5/2013 |
| CA | 3010124 C | 5/2019 |

OTHER PUBLICATIONS

Ashtari et al. "Asphaltene removal from crude oil by means of ceramic membranes" Journal of Petroleum Science and Engineering 82-83 (2012) 44-49, 6 pgs.

(Continued)

*Primary Examiner* — Tam M Nguyen
(74) *Attorney, Agent, or Firm* — Dinsmore & Shohl, LLP

(57) ABSTRACT

A process for upgrading a hydrocarbon feed, such as crude oil or other heavy oils, may include hydrotreating a hydrocarbon feed in a hydrotreating unit to produce a hydrotreated effluent that includes asphaltenes, coke precursors, or both. The process further includes hydrocracking the hydrotreated effluent in a hydrocracking unit to produce a hydrocracked effluent, adsorbing at least a portion of the asphaltenes, coke precursors, or both, from the hydrotreated effluent, the hydrocracked effluent, or both, separating the hydrocracked effluent into at least an upgraded lesser-boiling effluent and a greater-boiling effluent in a hydrocracked effluent separation system, and steam cracking the upgraded lesser-boiling effluent to produce olefins, aromatic compounds, or combinations of these. The process may further include recycling the greater boiling effluent back to the hydrotreating unit and hydrocracking a middle distillate effluent from the hydrocracked effluent separation system. Systems for conducting the processes are also disclosed.

13 Claims, 5 Drawing Sheets

(51) Int. Cl.
 *B01D 3/14* (2006.01)
 *B01J 8/04* (2006.01)
(52) U.S. Cl.
 CPC ...... *B01J 8/0492* (2013.01); *C10G 2300/202* (2013.01); *C10G 2300/205* (2013.01); *C10G 2300/206* (2013.01); *C10G 2300/208* (2013.01); *C10G 2300/308* (2013.01); *C10G 2400/20* (2013.01); *C10G 2400/22* (2013.01); *C10G 2400/30* (2013.01)

(56) References Cited

U.S. PATENT DOCUMENTS

| | | | | |
|---|---|---|---|---|
| 4,719,007 | A | * | 1/1988 | Johnson ................ C10G 45/02 208/144 |
| 4,775,460 | A | | 10/1988 | Reno |
| 5,358,634 | A | | 10/1994 | Rankel |
| 5,824,214 | A | | 10/1998 | Paul et al. |
| 6,217,746 | B1 | | 4/2001 | Thakkar et al. |
| 7,566,394 | B2 | | 7/2009 | Koseoglu |
| 7,763,163 | B2 | | 7/2010 | Koseoglu |
| 9,255,230 | B2 | | 2/2016 | Shafi et al. |
| 9,321,971 | B2 | | 4/2016 | Janssen et al. |
| 10,010,839 | B2 | | 7/2018 | Choi et al. |
| 10,246,647 | B2 | | 4/2019 | Litz et al. |
| 2006/0272983 | A1 | | 12/2006 | Droughton et al. |
| 2009/0156876 | A1 | * | 6/2009 | Ou ........................ C10G 25/03 585/820 |
| 2009/0301931 | A1 | * | 12/2009 | Koseoglu ................ C10C 3/00 208/22 |
| 2011/0073524 | A1 | | 3/2011 | Cybulskis et al. |
| 2012/0132566 | A1 | | 5/2012 | Janssen et al. |
| 2013/0104772 | A1 | * | 5/2013 | Schabron ............ B01F 17/0014 106/277 |
| 2013/0233766 | A1 | * | 9/2013 | Shafi ...................... C10G 45/00 208/61 |
| 2014/0021101 | A1 | | 1/2014 | Schabron et al. |
| 2014/0221712 | A1 | | 8/2014 | Greene et al. |
| 2015/0136651 | A1 | * | 5/2015 | Detellier ................ C10G 1/045 208/390 |
| 2015/0376515 | A1 | * | 12/2015 | Lim ...................... C10G 69/04 208/68 |
| 2016/0137933 | A1 | * | 5/2016 | Ward ..................... C10G 51/00 208/60 |
| 2017/0029720 | A1 | * | 2/2017 | Koseoglu ............... C10G 55/04 |
| 2018/0187100 | A1 | | 7/2018 | Koseoglu |
| 2018/0291288 | A1 | * | 10/2018 | Brown ............... C10G 67/0463 |
| 2019/0016971 | A1 | | 1/2019 | Shaik et al. |

OTHER PUBLICATIONS

Balabin et al. "Petroleum resins adsorption onto quartz sand: Near infrared (NIR) spectroscopy study" Journal of Colloid and Interface Science 318 (2008) 167-174, 8 pgs.
Gawel et al. "Effect of asphaltenes on hydroprocessing of heavy oils and residua" Applied Catalysis A: General 295 (2005) 89-94, 7 pgs.
Pernyeszi et al. "Asphaltene adsorption on clays and crude oil reservoir rocks" Colloids and Surfaces A: Physicochemical and Engineering Aspects 137 (1998) 373-384, 12 pgs.
Tarboush et al. "Dispersed Fe2O3 nanoparticles preparation in heavy oil and their uptake of asphaltenes" Fuel Processing Technology 133 (2015) 120-127, 8 pgs.
Ancheyta et al. "Changes in Asphaltene Properties during Hydrotreating of Heavy Crudes" Energy & Fuels 2003, 17, 1233-1238, 6 pgs.
Tarboush et al. "Adsorption of asphaltenes from heavy oil onto in situ prepared NiO nanoparticles" Journal of Colloid and Interface Science 378 (2012) 64-69, 6 pgs.
International Search Report and Written Opinion dated Feb. 17, 2021 in related International Application No. PCT/US2020/061241 filed Nov. 19, 2020.

* cited by examiner

US 11,384,299 B2

SYSTEMS AND PROCESSES FOR UPGRADING AND CONVERTING CRUDE OIL TO PETROCHEMICALS THROUGH STEAM CRACKING

BACKGROUND

Field

The present disclosure relates to systems and processes for processing petroleum-based materials, in particular, systems and processes for upgrading and converting crude oil to petrochemical products and intermediates through hydroprocessing and steam cracking.

Technical Background

Petrochemical feeds, such as crude oils, can be converted to chemical products and intermediates such as olefins and aromatic compounds, which are basic intermediates for a large portion of the petrochemical industry. The worldwide increasing demand for light olefins and aromatic compounds remains a major challenge for many integrated refineries. In particular, the production of some valuable light olefins such as ethylene, propene, and butene has attracted increased attention as pure olefin streams are considered the building blocks for polymer synthesis. Additionally, aromatic compounds such as benzene, toluene, ethylbenzene, and xylenes are valuable intermediates for synthesizing polymers and other organic compounds as well as for fuel additives.

Olefins and aromatic compounds can be produced through stream cracking of hydrocarbon feeds, such as natural gas, naphtha, or atmospheric gas oil (AGO). In order to obtain greater yields of olefins and aromatic compounds, suitable feedstocks for steam cracking processes are generally rich in paraffinic hydrocarbons with lesser concentrations of aromatic compounds, which may reduce the formation of undesired by-products and coke formation during steam cracking. Crude oil and other heavy oils are increasingly being considered as feedstocks for steam cracking processes. While crude oil and other heavy oils may be a potential feedstock, the concentrations of metal, nitrogen, sulfur, asphaltenes, polyaromatic compounds, and other large organic molecules in crude oil and other heavy oils can contribute to contamination of effluent streams form the steam cracking process and production of coke, which can buildup on downstream equipment. When using crude oil and other heavy oils as a feed stock for steam cracking, up to 30 weight percent of the crude oil comprising the constituents having boiling point temperatures greater than 540 degrees Celsius must be rejected and removed from the system to reduce coke formation and ensure smooth operation of the steam cracking system.

SUMMARY

Accordingly, there is an ongoing need for systems and processes for increasing the yield of olefins and aromatic compounds from a steam cracking process when using crude oil or other heavy oils for the hydrocarbon feed. The systems and processes of the present disclosure may provide for increased yield of olefins and aromatic compounds from steam cracking by subjecting a crude oil or heavy oil to hydroprocessing to remove trace impurities and upgrade the crude oil or heavy oil to produce an upgraded lesser-boiling effluent having increased concentrations of paraffinic compounds. The systems and methods of the present disclosure may increase the yields of olefins and aromatic compounds from steam cracking of crude oil and other heavy oils by enabling a greater portion of the crude oil to be converted to steam crackable constituents, such as paraffins and other hydrocarbons having boiling point temperatures less than or equal to 180° C., for feeding to the steam cracking process. Thus, a greater portion of the constituents having boiling point temperatures greater than 540° C. can be converted to olefins and aromatic compounds rather than being rejected and removed prior to steam cracking.

The hydroprocessing may include hydrotreating the crude oil or heavy oil with hydrotreating catalysts in a hydrotreating system to remove impurities such as sulfur, nitrogen, and metals, and to de-aromatize polyaromatic compounds and asphaltenes. Hydroprocessing may further include hydrocracking the hydrotreated effluent in the presence of a hydrocracking catalyst in a hydrocracking unit to convert at least a portion of the remaining aromatic and polyaromatic compounds in the hydrotreated effluent to paraffinic compounds. The resulting hydrocracked effluent may have an increased concentration of hydrocarbons having boiling point temperatures less than or equal to 180° C. compared to the hydrotreated effluent. The hydrocracked effluent is then separated in a hydrocracked effluent separation system to produce at least the upgraded lesser-boiling effluent and a greater-boiling effluent. The upgraded lesser-boiling effluent may be passed to the steam cracking system as the feed for steam cracking. The greater-boiling effluent may be passed back to the hydroprocessing system, such as back to the hydrotreating unit, for further conversion of greater-boiling constituents to hydrocarbons having boiling point temperatures less than or equal to 180° C., which may further increase the yield of olefins and aromatic compounds from the steam cracking system. The hydrocracked effluent separation system may further separate a middle-boiling effluent, which may be further hydrocracked in a secondary hydrocracking unit.

During hydrotreating of the crude oil or heavy oils, the severe conditions may breakdown oil fractions that stabilize and solubilize coke precursors, such as asphaltene compounds. Destruction of the stabilization system for the asphaltenes and other coke precursors may result in precipitation of asphaltenes and other coke precursors from the hydrotreated effluent. The precipitated asphaltenes and other coke precursors may deposit on downstream hydrocracking catalysts, causing deactivation of the hydrocracking catalysts. Deactivation of the hydrocracking catalysts caused by deposition of asphaltenes and coke on the hydrocracking catalyst may reduce the yield of paraffinic compounds from the hydrocracking process and cause problems with catalyst life and smooth operation of the hydrocracking process. Even at small concentrations, such as less than 0.5 weight percent, asphaltenes and other coke precursors can cause significant deactivation of hydrocracking catalysts.

To reduce deactivation of hydrocracking catalysts and deposition of asphaltenes and coke on process equipment downstream of the hydrotreating unit, the systems of the present disclosure may include an adsorption unit operable to remove at least a portion of the asphaltenes and other coke precursors from the system. Processes of the present disclosure may include passing one or more of the process effluents, such as the hydrotreated effluent, the hydrocracked effluent, or other stream, through the adsorption unit to remove the asphaltene compounds and other coke precursors. The systems and processes of the present disclosure may increase the yield of olefins and aromatic compounds from steam cracking crude oil or other heavy oils by removing impurities from the crude oil or heavy oil and converting a greater portion of the hydrocarbons in the crude oil or heavy oil to hydrocarbons having boiling point temperatures less than or equal to 180° C. Additionally, the systems and processes of the present disclosure may improve efficient operation of the hydrocracking unit and steam cracking system by removing asphaltenes and other coke precursors from the process effluent streams.

According to at least one aspect of the present disclosure, a process for upgrading a hydrocarbon feed may include hydrotreating a hydrocarbon feed to produce a hydrotreated effluent, where the hydrotreated effluent may comprise asphaltenes, coke precursors, or both. The process may further include hydrocracking the at least a portion of the hydrotreated effluent to produce a hydrocracked effluent and adsorbing at least a portion of the asphaltenes, coke precursors, or both, from the hydrotreated effluent, the hydrocracked effluent, or both. The process may further include separating the hydrocracked effluent into at least an upgraded lesser-boiling effluent and a greater-boiling effluent and steam cracking the upgraded lesser-boiling effluent to produce olefins, aromatic compounds, or combinations of these.

According to another aspect of the present disclosure, a process for upgrading a hydrocarbon feed may include contacting the hydrocarbon feed with at least one hydrotreating catalyst in the presence of hydrogen in at least one hydrotreating zone. The hydrocarbon feed may comprise whole crude or desalted whole crude and the contacting may remove at least one of metals, sulfur compounds, nitrogen compounds, or combinations of these to produce a hydrotreated effluent. The process may further include contacting the hydrotreated effluent with a hydrocracking catalyst in the presence of hydrogen, where contacting with the hydrocracking catalyst may cause at least a portion of hydrocarbons in the hydrotreated effluent to undergo hydrocracking reactions to produce a hydrocracked effluent. The process may further include contacting at least a portion of the hydrotreated effluent or at least a portion of the hydrocracked effluent with an adsorbent in an adsorption unit. The adsorbent may remove at least a portion of asphaltenes, coke precursors, or both, from the portion of the hydrotreated effluent or the portion of the hydrocracked effluent. The process may further include passing the hydrocracked effluent to a hydrocracked effluent separation system operable to separate the hydrocracked effluent into at least an upgraded lesser-boiling effluent and a greater boiling effluent and contacting the upgraded lesser-boiling effluent with steam in a steam cracking zone maintained at a steam cracking temperature. Contacting the upgraded lesser-boiling effluent with steam at the steam cracking temperature may cause at least a portion of the upgraded lesser-boiling effluent to undergo thermal cracking to produce a steam cracking effluent comprising olefins, aromatic compounds, or both.

According to still another aspect of the present disclosure, a system for processing crude oil may include a hydrotreating unit comprising at least one hydrotreating catalyst. The hydrotreating unit may be operable to contact the crude oil with the at least one hydrotreating catalyst. Contact with the hydrotreating catalyst may upgrade the crude oil to a hydrotreated effluent having a reduced concentration of at least one of nitrogen, sulfur, metals, aromatic compounds, or combinations of these. The system may further include a hydrocracking unit disposed downstream of the hydrotreating unit and comprising a hydrocracking catalyst. The hydrocracking unit may be operable to contact at least a portion of the hydrotreated effluent with the hydrocracking catalyst at conditions sufficient to convert at least a portion of the hydrotreated effluent to produce a hydrocracked effluent comprising hydrocarbons having a boiling point temperature less than or equal to 180° C. The system may further include an adsorption unit downstream of the hydrotreating unit or the hydrocracking unit. The adsorption unit may be operable to contact the hydrotreated effluent or the hydrocracked effluent with an adsorbent capable of adsorbing asphaltenes, coke precursors, or both from the hydrotreated effluent or the hydrocracked effluent. The system may further include a hydrocracked effluent separation system downstream of the hydrocracking unit. The hydrocracked effluent separation system may be operable to separate at least a portion of the hydrocracked effluent into at least an upgraded lesser-boiling effluent and a greater-boiling effluent. The system may further include a steam cracking system downstream of the hydrocracked effluent separation system. The steam cracking system may be operable to convert at least a portion of the upgraded lesser-boiling effluent to produce olefins, aromatic compounds, or both.

Additional features and advantages of the technology described in this disclosure will be set forth in the detailed description which follows, and in part will be readily apparent to those skilled in the art from the description or recognized by practicing the technology as described in this disclosure, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

Figure 1:
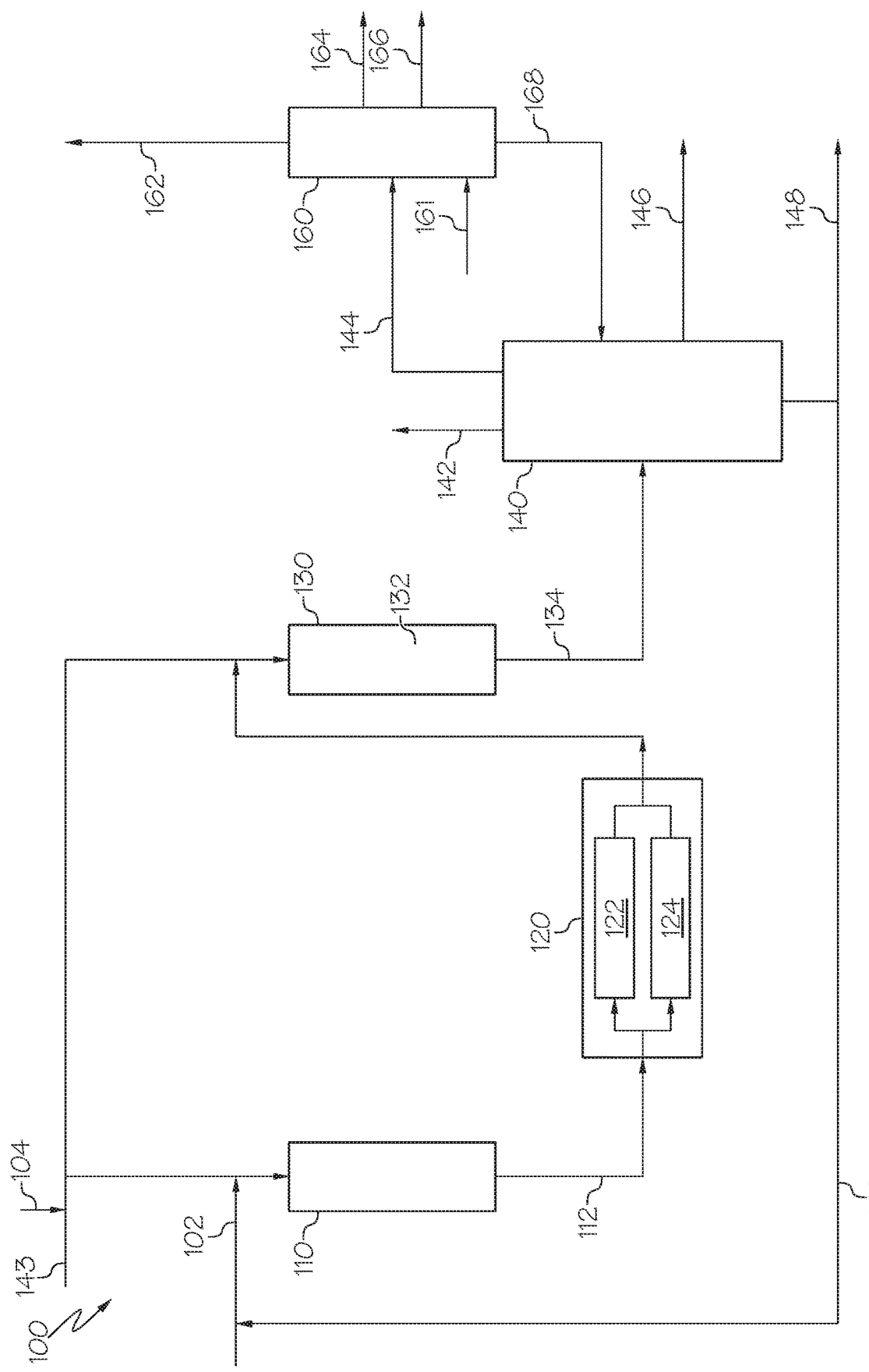
FIG. 1 schematically depicts a generalized flow diagram of a system for upgrading heavy oils to olefins, aromatic compounds, or both, according to one or more embodiments shown and described in this disclosure.

For the purpose of describing the simplified schematic illustrations and descriptions of FIGS. 1-6, the numerous valves, temperature sensors, electronic controllers and the like that may be employed and well known to those of ordinary skill in the art of certain chemical processing operations are not included. Further, accompanying components that are often included in chemical processing operations, such as, for example, air supplies, heat exchangers, surge tanks, or other related systems are not depicted. It would be known that these components are within the spirit and scope of the present embodiments disclosed. However, operational components, such as those described in the present disclosure, may be added to the embodiments described in this disclosure.

It should further be noted that arrows in the drawings refer to process streams. However, the arrows may equivalently refer to transfer lines which may serve to transfer process steams between two or more system components. Additionally, arrows that connect to system components define inlets or outlets in each given system component. The arrow direction corresponds generally with the major direction of movement of the materials of the stream contained within the physical transfer line signified by the arrow. Furthermore, arrows which do not connect two or more system components signify a product stream which exits the depicted system or a system inlet stream which enters the depicted system. Product streams may be further processed in accompanying chemical processing systems or may be commercialized as end products. System inlet streams may be streams transferred from accompanying chemical processing systems or may be non-processed feedstock streams. Some arrows may represent recycle streams, which are effluent streams of system components that are recycled back into the system. However, it should be understood that any represented recycle stream, in some embodiments, may be replaced by a system inlet stream of the same material, and that a portion of a recycle stream may exit the system as a system product.

Additionally, arrows in the drawings may schematically depict process steps of transporting a stream from one system component to another system component. For example, an arrow from one system component pointing to another system component may represent "passing" a system component effluent to another system component, which may include the contents of a process stream "exiting" or being "removed" from one system component and "introducing" the contents of that product stream to another system component.

It should be understood that two or more process streams are "mixed" or "combined" when two or more lines intersect in the schematic flow diagrams of FIGS. 1-6. Mixing or combining may also include mixing by directly introducing both streams into a like reactor, separation device, or other system component. For example, it should be understood that when two streams are depicted as being combined directly prior to entering a separation unit or reactor, that in some embodiments the streams could equivalently be introduced into the separation unit or reactor and be mixed in the reactor.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

Figure 4:
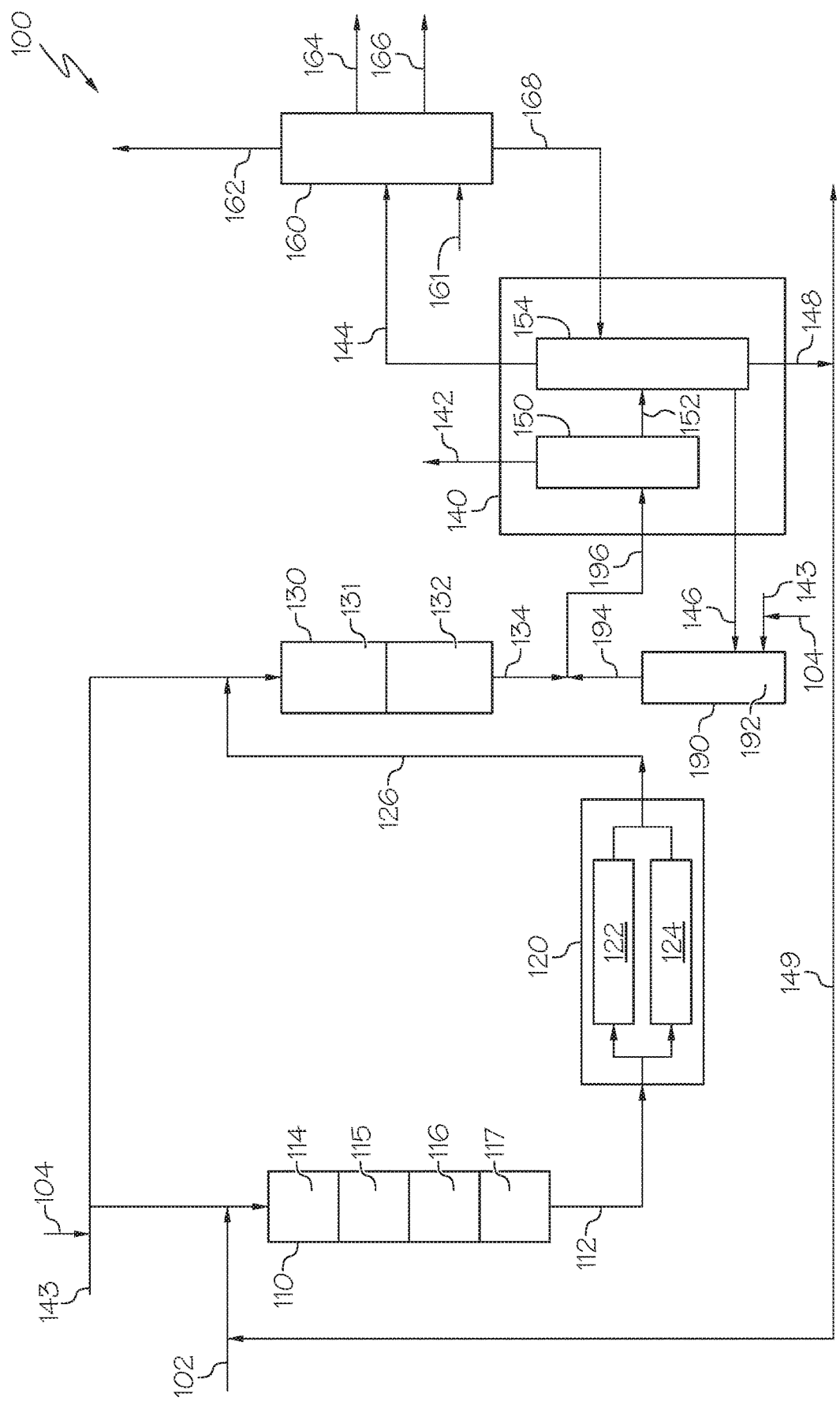
FIG. 4 schematically depicts a generalized flow diagram of another embodiment of a system for upgrading heavy oils to olefins, aromatic compounds, or both, according to one or more embodiments shown and described in this disclosure.

The present disclosure is directed to systems and methods for upgrading heavy oils, such as crude oil, to produce more valuable chemical intermediates, such as olefins and aromatic compounds, for example. Referring to FIG. 1, one embodiment of a system 100 for upgrading a hydrocarbon feed 102 comprising crude oil or other heavy oil is schematically depicted. The system 100 includes a hydrotreating unit 110 comprising at least one hydrotreating catalyst and operable to contact the crude oil or other heavy oil with the at least one hydrotreating catalyst, a hydrocracking unit 130 disposed downstream of the hydrotreating unit 110 and comprising a hydrocracking catalyst, and an adsorption unit 120 downstream of the hydrotreating unit 110 or the hydrocracking unit 130 and operable to contact a hydrotreated effluent 112 or a hydrocracked effluent 134 with an adsorbent capable of adsorbing asphaltenes, coke precursors, or both. The system 100 further includes a hydrocracked effluent separation system 140 downstream of the hydrocracking unit 130 and a steam cracking system 160 downstream of the hydrocracked effluent separation system 140. The system 100 may further include a greater-boiling effluent recycle 149 operable to pass a greater-boiling effluent 148 from the hydrocracked effluent separation system 140 back to the hydrotreating unit 110. Referring to FIG. 4, the system 100 may further include a secondary hydrocracking unit 190 operable to contact a middle distillate effluent 146 from the hydrocracked effluent separation system 140 with a secondary hydrocracking catalyst. The system 100 may be operable to upgrade hydrocarbons in the crude oil or other heavy oil into an upgraded lesser-boiling effluent 144 comprising hydrocarbons having boiling point temperatures less than 180° C. and then steam cracking this upgraded lesser-boiling effluent 144 to produce olefins, aromatic compounds, or both. The system 100 may further include passing a pyrolysis oil 168 from the steam cracking system 160 back to the hydrocracked effluent separation system 140 for further conversion of constituents of the crude oil or heavy oil to the upgraded lesser-boiling effluent 144.

Referring again to FIG. 1, a process for upgrading a hydrocarbon feed 102, such as the crude oil or other heavy oil, includes hydrotreating the hydrocarbon feed 102 to produce a hydrotreated effluent 112, where the hydrotreated effluent 112 may include asphaltenes, coke precursors, or both. The process further includes hydrocracking at least a portion of the hydrotreated effluent 112 to produce a hydrocracked effluent 134 and adsorbing at least a portion of the asphaltenes, coke precursors, or both, from the hydrotreated effluent 112, the hydrocracked effluent 134, or both. The process further includes separating the hydrocracked effluent 134 into at least an upgraded lesser-boiling effluent 144 and a greater-boiling effluent 148 and steam cracking the upgraded lesser-boiling effluent 144 to produce olefins, aromatic compounds, or combinations of these. The upgraded lesser-boiling effluent 144 may include hydrocarbons having boiling point temperatures less than or equal to 180° C. The process may further include recycling the greater-boiling effluent 148 to the hydrotreating process and hydrotreating the greater-boiling effluent 148. The process may further include hydrocracking a middle distillate effluent 146 separated from the hydrocracked effluent 134. The process may further include passing a pyrolysis oil 168 from the steam cracking process back into the system for further conversion of hydrocarbons to the upgraded lesser-boiling effluent 144.

The systems and processes of the present disclosure may enable crude oil and heavy oils to be used as the hydrocarbon feed for production of olefins and aromatic compounds through steam cracking. The systems and processes of the present disclosure may also enable crude oil and other heavy oils to be introduced directly to the process without upstream separation processes, such as fractionation columns, that can be costly to construct and operate. The systems and processes of the present disclosure may reduce deactivation of hydrocracking catalysts by removing asphaltenes and other coke precursors from the system, which may improve operation of the system. The systems and processes of the present disclosure may also increase conversion of hydrocarbons in the crude oil or other heavy oil to the upgraded lesser-boiling effluent, which can then be used as a feed for the steam cracking process. This may result in increased yield of olefins, aromatic compounds, or both from the crude oil or other heavy oil compared to other steam cracking processes, among other features.

As used in this disclosure, a "reactor" refers to any vessel, container, or the like, in which one or more chemical reactions may occur between one or more reactants optionally in the presence of one or more catalysts. For example, a reactor may include a tank or tubular reactor configured to operate as a batch reactor, a continuous stirred-tank reactor (CSTR), or a plug flow reactor. Example reactors include packed bed reactors such as fixed bed reactors, and fluidized bed reactors. One or more "reaction zones" may be disposed within a reactor. As used in this disclosure, a "reaction zone" refers to an area where a particular reaction takes place in a reactor. For example, a packed bed reactor with multiple catalyst beds may have multiple reaction zones, where each reaction zone is defined by the area of each catalyst bed.

As used in this disclosure, a "separation unit" refers to any separation device that at least partially separates one or more chemicals in a mixture from one another. For example, a separation unit may selectively separate different chemical species from one another, forming one or more chemical fractions. Examples of separation units include, without limitation, distillation columns, fractionators, flash drums, knock-out drums, knock-out pots, centrifuges, filtration devices, traps, scrubbers, expansion devices, membranes, solvent extraction devices, high-pressure separators, low-pressure separators, and the like. It should be understood that separation processes described in this disclosure may not completely separate all of one chemical consistent from all of another chemical constituent. It should be understood that the separation processes described in this disclosure "at least partially" separate different chemical components from one another, and that even if not explicitly stated, it should be understood that separation may include only partial separation. As used in this disclosure, one or more chemical constituents may be "separated" from a process stream to form a new process stream. Generally, a process stream may enter a separation unit and be divided or separated into two or more process streams of desired composition.

As used in this disclosure, the term "fractionation" may refer to a process of separating one or more constituents of a composition in which the constituents are divided from each other during a phase change based on differences in properties of each of the constituents. As an example, as used in this disclosure, "distillation" refers to separation of constituents of a liquid composition based on differences in the boiling point temperatures of constituents of a composition.

Further, in some separation processes, a "lesser-boiling effluent" and a "greater-boiling effluent" may separately exit the separation unit. In general, the lesser-boiling effluent has a lesser boiling point temperature than the greater-boiling effluent. Some separation systems may produce a "middle-boiling effluent," which may include constituents having boiling point temperatures between the boiling point temperatures of the lesser-boiling effluent and the greater-boiling effluent. The middle-boiling effluent may be referred to as middle distillate. Some separation systems may be operable to produce a plurality of streams, each with a different boiling point range. It should be additionally understood that where only one separation unit is depicted in a figure or described, two or more separation units may be employed to carry out the identical or substantially identical separations. For example, where a distillation column with multiple outlets is described, it is contemplated that several separators arranged in series may equally separate the feed stream and such embodiments are within the scope of the presently described embodiments.

As used in this disclosure, the terms "upstream" and "downstream" may refer to the relative positioning of unit operations with respect to the direction of flow of the process streams. A first unit operation of a system may be considered "upstream" of a second unit operation if process streams flowing through the system encounter the first unit operation before encountering the second unit operation. Likewise, a second unit operation may be considered "downstream" of the first unit operation if the process streams flowing through the system encounter the first unit operation before encountering the second unit operation.

As used in the present disclosure, passing a stream or effluent from one unit "directly" to another unit may refer to passing the stream or effluent from the first unit to the second unit without passing the stream or effluent through an intervening reaction system or separation system that substantially changes the composition of the stream or effluent. Heat transfer devices, such as heat exchangers, preheaters, coolers, condensers, or other heat transfer equipment, and pressure devices, such as pumps, pressure regulators, compressors, or other pressure devices, are not considered to be intervening systems that change the composition of a stream or effluent. Combining two streams or effluents together also is not considered to comprise an intervening system that changes the composition of one or both of the streams or effluents being combined.

As used in this disclosure, the term "end boiling point" or "EBP" of a composition may refer to the temperature at which the greatest boiling temperature constituents of the composition transition from the liquid phase to the vapor phase.

As used in this disclosure, the term "effluent" may refer to a stream that is passed out of a reactor, a reaction zone, or a separation unit following a particular reaction or separation. Generally, an effluent has a different composition than the stream that entered the separation unit, reactor, or reaction zone. It should be understood that when an effluent is passed to another system unit, only a portion of that system stream may be passed. For example, a slip stream may carry some of the effluent away, meaning that only a portion of the effluent may enter the downstream system unit. The term "reaction effluent" may more particularly be used to refer to a stream that is passed out of a reactor or reaction zone.

As used in this disclosure, a "catalyst" refers to any substance which increases the rate of a specific chemical reaction. Catalysts described in this disclosure may be utilized to promote various reactions, such as, but not limited to, hydrodemetalization, hydrodesulfurization, hydrodenitrogenation, hydrodearomatization, hydrocracking, cracking, aromatic cracking, or combinations thereof.

As used in this disclosure, "cracking" generally refers to a chemical reaction where a molecule having carbon-carbon bonds is broken into more than one molecule by the breaking of one or more of the carbon-carbon bonds; where a compound including a cyclic moiety, such as an aromatic, is converted to a compound that does not include a cyclic moiety; or where a molecule having carbon-carbon double bonds are reduced to carbon-carbon single bonds. Some catalysts may have multiple forms of catalytic activity, and calling a catalyst by one particular function does not render that catalyst incapable of being catalytically active for other functionality. As used throughout the present disclosure, "hydrocracking" may refer to catalytic cracking of hydrocarbons conducted in the presence of hydrogen.

As used throughout the present disclosure, the term "butene" or "butenes" refer to one or more than one of 1-butene, trans-2-butene, cis-2-butene, isobutene, or mixtures of these isomers. As used throughout the present disclosure, the term "normal butenes" may refer to one or more than one of 1-butene, trans-2-butene, cis-2-butene, or mixtures of these isomers, and does not include isobutene. As used throughout the present disclosure, the term "2-butene" may refer to trans-2-butene, cis-2-butene, or a mixture of these two isomers.

As used throughout the present disclosure, the term "xylenes," when used without a designation of the isomer, such as the prefix para, meta, or ortho (or letters p, m, and o, respectively), may refer to one or more of meta-xylene, ortho-xylene, para-xylene, and mixtures of these xylene isomers.

As used throughout the present disclosure, the term "crude oil" or "whole crude oil" may refer to crude oil received directly from an oil field or from a desalting unit without having any fraction separated by distillation.

It should be understood that the reactions promoted by catalysts as described in this disclosure may remove a chemical constituent, such as only a portion of a chemical constituent, from a process stream. For example, a hydrodemetalization (HDM) catalyst may be present in an amount sufficient to promote a reaction that removes a portion of one or more metals from a process stream. A hydrodenitrogenation (HDN) catalyst may be present in an amount sufficient to promote a reaction that removes a portion of the nitrogen present in a process stream. A hydrodesulfurization (HDS) catalyst may be present in an amount sufficient to promote a reaction that removes a portion of the sulfur present in a process stream. A hydrodearomatization (HDA) catalyst may be present in an amount sufficient to promote a reaction that converts aromatics to naphthalenes, paraffinic compounds, or both. A hydrocracking catalyst may be present in an amount sufficient to promote a reaction that converts aromatics, which are hard to convert in the steam cracking system, to naphthalenes, paraffinic compounds, or both, which are easier to convert in the steam cracking system. It should be understood that, throughout this disclosure, a particular catalyst may not be limited in functionality to the removal, conversion, or cracking of a particular chemical constituent or moiety when it is referred to as having a particular functionality. For example, a catalyst identified in this disclosure as an HDN catalyst may additionally provide hydrodearomatization functionality, hydrodesulfurization functionality, or both.

It should further be understood that streams may be named for the components of the stream, and the component for which the stream is named may be the major component of the stream (such as comprising from 50 wt. %, from 70 wt. %, from 90 wt. %, from 95 wt. %, from 99 wt. %, from 99.5 wt. %, or even from 99.9 wt. % of the contents of the stream to 100 wt. % of the contents of the stream). It should also be understood that components of a stream are disclosed as passing from one system component to another when a stream comprising that component is disclosed as passing from that system component to another. For example, a disclosed "hydrogen stream" passing to a first system component or from a first system component to a second system component should be understood to equivalently disclose "hydrogen" passing to the first system component or passing from a first system component to a second system component.

Referring to FIG. 1, a system 100 of the present disclosure for converting a hydrocarbon feed 102 to olefins, aromatic compounds, or both, through hydroprocessing and steam cracking is schematically depicted. The system 100 may include the hydrotreating unit 110, the hydrocracking unit 130 downstream of the hydrotreating unit 110, the hydrocracked effluent separation system 140 downstream of the hydrocracking unit 130, and the steam cracking system 160 downstream of the hydrocracked effluent separation system 140. The system 100 may also include the adsorption unit 120 disposed downstream of the hydrotreating unit 110. Referring to FIG. 4, the system 100 may further include the secondary hydrocracking unit 190 operable to convert at least a portion of a middle distillate effluent 146 from the hydrocracked effluent separation system 140 to additional hydrocarbons having boiling point temperatures less than or equal to 180° C.

Referring again to FIG. 1, the hydrocarbon feed 102 may include one or more heavy oils, such as but not limited to crude oil, vacuum residue, tar sands, bitumen, atmospheric residue, vacuum gas oils, other heavy oil streams, or combinations of these. It should be understood that, as used in this disclosure, a "heavy oil" may refer to a raw hydrocarbon, such as crude oil, which has not been previously processed through distillation, or may refer to a hydrocarbon which has undergone some degree of processing prior to being introduced to the system 100 as the hydrocarbon feed 102. The hydrocarbon feed 102 may have a density of less than or equal to 0.86 grams per milliliter. The hydrocarbon feed 102 may have an end boiling point (EBP) of less than 720° C. The hydrocarbon feed 102 may have a concentration of nitrogen of less than or equal to 900 parts per million by weight (ppmw).

In one or more embodiments, the hydrocarbon feed 102 may be a crude oil. The crude oil may have an American Petroleum Institute (API) gravity of from 25 degrees to 50 degrees. For example, the hydrocarbon feed 102 may include an Arab light crude oil. Example properties for an exemplary grade of Arab light crude oil are listed in Table 1.

TABLE 1

Example of Arab Light Export Feedstock

| Analysis | Units | Value | Test Method |
|---|---|---|---|
| American Petroleum Institute (API) gravity | degree | 33.13 | ASTM D287 |
| Density | grams per milliliter (g/mL) | 0.8595 | ASTM D287 |
| Carbon Content | weight percent (wt. %) | 85.29 | ASTM D5291 |
| Hydrogen Content | wt. % | 12.68 | ASTM D5292 |
| Sulfur Content | wt. % | 1.94 | ASTM D5453 |
| Nitrogen Content | parts per million by weight (ppmw) | 849 | ASTM D4629 |
| Asphaltenes | wt. % | 1.2 | ASTM D6560 |
| Micro Carbon Residue (MCR) | wt. % | 3.4 | ASTM D4530 |
| Vanadium (V) Content | ppmw | 15 | IP 501 |
| Nickel (Ni) Content | ppmw | 12 | IP 501 |

TABLE 1-continued

Example of Arab Light Export Feedstock

| Analysis | Units | Value | Test Method |
| --- | --- | --- | --- |
| Arsenic (As) Content | ppmw | 0.04 | IP 501 |
| Boiling Point Distribution | | | |
| Initial Boiling Point (IBP) | Degrees Celsius (° C.) | 33 | ASTM D7169 |
| 5% Boiling Point (BP) | ° C. | 92 | ASTM D7169 |
| 10% BP | ° C. | 133 | ASTM D7169 |
| 20% BP | ° C. | 192 | ASTM D7169 |
| 30% BP | ° C. | 251 | ASTM D7169 |
| 40% BP | ° C. | 310 | ASTM D7169 |
| 50% BP | ° C. | 369 | ASTM D7169 |
| 60% BP | ° C. | 432 | ASTM D7169 |
| 70% BP | ° C. | 503 | ASTM D7169 |
| 80% BP | ° C. | 592 | ASTM D7169 |
| 90% BP | ° C. | >720 | ASTM D7169 |
| 95% BP | ° C. | >720 | ASTM D7169 |
| End Boiling Point (EBP) | ° C. | >720 | ASTM D7169 |
| BP range C5-180° C. | wt. % | 18.0 | ASTM D7169 |
| BP range 180° C.-350° C. | wt. % | 28.8 | ASTM D7169 |
| BP range 350° C.-540° C. | wt. % | 27.4 | ASTM D7169 |
| BP range >540° C. | wt. % | 25.8 | ASTM D7169 |

Weight percentages in Table 1 are based on the total weight of the crude oil.

When the hydrocarbon feed 102 comprises a crude oil, the crude oil may be a whole crude or may be a crude oil that has undergone at some processing, such as desalting, solids separation, scrubbing. For example, the hydrocarbon feed 102 may be a de-salted crude oil that has been subjected to a de-salting process. In some embodiments, the hydrocarbon feed 102 may include a crude oil that has not undergone pretreatment, separation (such as distillation), or other operation that changes the hydrocarbon composition of the crude oil prior to introducing the crude oil to the system 100.

Referring again to FIG. 1, the hydrocarbon feed 102 may be introduced directly to the hydrotreating unit 110 or may be combined with hydrogen upstream of the hydrotreating unit 110. The hydrogen may be recycled hydrogen 143 recovered from the system 100, such as from the hydrocracked effluent separation system 140, the steam cracking unit 160, or both. The hydrogen may also include supplemental hydrogen 104 from an external hydrogen source (not shown). The hydrogen, such as recycled hydrogen 143, supplemental hydrogen 104, or both, may be passed directly to the hydrotreating unit 110 or combined with the hydrocarbon feed 102 upstream of the hydrotreating unit 110.

The hydrotreating unit 110 may be operable to remove one or a plurality of impurities, such as metals, sulfur compounds, nitrogen compounds, asphaltenes, or combinations of these, from the hydrocarbon feed 102. Additionally, the hydrotreating unit 110 may be operable to saturate at least a portion of polyaromatic compounds in the hydrocarbon feed 102. The hydrotreating unit 110 may include at least one hydrotreating catalyst, which may be disposed in at least one hydrotreating zone within the hydrotreating unit 110. The hydrotreating unit 110 may be operable to contact the hydrocarbon feed 102 with the at least one hydrotreating catalyst in the presence of hydrogen, where contact with the hydrotreating catalyst may upgrade the hydrocarbon feed 102 to produce a hydrotreated effluent 112 having a reduced concentration of at least one of nitrogen, sulfur, metals, aromatic compounds, or combinations of these.

The hydrotreating unit 110 may include one or a plurality of hydrotreating zones. Referring now to FIG. 4, the hydrotreating unit 110 may include a plurality of packed bed reaction zones arranged in series, such as one or more of a hydrodemetalization (HDM) reaction zone 114, a transition zone 115, a hydrodesulfurization (HDS) zone 116, a hydrodenitrogenation (HDN) zone 117, a hydrodearomatization (HDA) zone (not shown), or combinations of these reaction zones. Each of the plurality of reaction zones may be disposed in a single reactor or in multiple reactors in series. Each of the HDM reaction zone 114, the transition reaction zone 115, the HDS reaction zone 116, the HDN reaction zone 117, and the HDA reaction zone (not shown) may include a catalyst bed comprising a hydrotreating catalyst. The hydrotreating unit 110 may include one or a plurality of the HDM reaction zone 114 comprising an HDM catalyst, the transition reaction zone 115 comprising a transition catalyst, the HDS reaction zone 116 comprising an HDS catalyst, an HDN reaction zone 117 comprising an HDN catalyst, the HDA reaction zone comprising an HDA catalyst, or combinations of these. The reaction zones of the hydrotreating unit 110 may be in any order, and are not necessarily in the order depicted in FIG. 4. In one or more embodiments, the hydrotreating unit 110 may include the HDM reaction zone 114, the transition reaction zone 115 downstream of the HDM reaction zone 114, and the HDS reaction zone 116 downstream of the transition reaction zone 115. The hydrotreating unit 110 may include any type of reactor suitable for contacting the hydrocarbon feed 102 with the hydrotreating catalysts. Suitable reactors may include, but are not limited to, fixed bed reactors, moving bed reactors, fluidized bed reactors, plug flow reactors, other types of reactors, or combinations of reactors. For example, the hydrotreating unit 110 may include one or more fixed bed reactors, which may be operated in downflow, upflow, or horizontal flow configurations.

Referring to FIGS. 1 and 4, the hydrotreating catalysts in the hydrotreating unit 110 may include one or more metals selected from the metallic elements in Groups 5, 6, 8, 9, or 10 of the International Union of Pure and Applied Chemistry (IUPAC) periodic table, such as, but not limited to, molybdenum, nickel, cobalt, tungsten, or combinations of these. The metals of the hydrotreating catalysts may be present as pure metals, metal oxides, metal sulfides, or combinations of these. The metals, metal oxides, or metal sulfides of the hydrotreating catalysts may be supported on a support, such as a silica, alumina, or a combination of these. The support material may include, but is not limited to, gamma-alumina or silica/alumina extrudates, spheres, cylinders, beads, pellets, and combinations thereof. In one or more embodiments, the hydrotreating catalysts may include nickel and molybdenum on an alumina support or cobalt and molybdenum on an alumina support.

When the hydrotreating catalysts present in the hydrotreating unit 110 include an HDM catalyst, the HDM catalyst may include one or more metals from the Groups 5, 6, or 8-10 of the IUPAC periodic table, which may be in the form of metals, metal oxides, or metal sulfides. For example, the HDM catalyst may comprise molybdenum. The HDM catalyst may further comprise a support material, and the metal may be disposed on the support material. The support material may be a gamma-alumina support, with a surface area of from 100 meters squared per gram ($m^2/g$) to 160 $m^2/g$, such as from 100 $m^2/g$ to 130 $m^2/g$, or from 130 $m^2/g$ to 160 $m^2/g$. The HDM catalyst may include from 0.5 wt. % to 12 wt. % of an oxide or sulfide of molybdenum, such as from 2 wt. % to 10 wt. % or from 3 wt. % to 7 wt. % of an oxide or sulfide of molybdenum based on the total weight of the HDM catalyst. The HDM catalyst may have a total pore volume of greater than or equal to 0.8 cubic centimeters per gram ($cm^3/g$), greater than or equal to 0.9 $cm^3/g$, or even greater than or equal to 1.0 cm³/g. The HDM catalyst macroporous having an average pore size of greater than or equal to 50 nanometers (nm). The HDM catalyst may include a dopant comprising one or more compounds that include elements selected from the group consisting of boron, silicon, halogens, phosphorus, and combinations thereof.

When the hydrotreating catalysts present in the hydrotreating unit 110 include an HDS catalyst, the HDS catalyst may include one or more metals supported on a support material. The metals of the HDS catalyst may include one or more metals from Group 6 and one metal from Groups 8-10 of the IUPAC periodic table, which may be present as metals, metal oxides, or metal sulfides. The HDS catalyst may include one or more metals selected from molybdenum, tungsten, nickel, cobalt, or combinations of these, which may be present as metals, metal oxides, or metal sulfides. The HDS catalyst may further include a support material, and the metals, metal oxides, or metal sulfides may be disposed on the support material. In some embodiments, the HDS catalyst may comprise Mo and Ni on an alumina support (sometimes referred to as a "Mo-Ni/Al$_2$O$_3$catalyst"). The HDS catalyst may also contain a dopant that is selected from the group consisting of boron, phosphorus, halogens, silicon, and combinations thereof. The HDS catalyst may include from 10 wt. % to 18 wt. % of an oxide or sulfide of molybdenum, such as from 11 wt. % to 17 wt. % or from 12 wt. % to 16 wt. % of an oxide or sulfide of molybdenum based on the total weight of the HDS catalyst. Additionally or alternatively, the HDS catalyst may include from 1 wt. % to 7 wt. % of an oxide or sulfide of nickel, such as from 2 wt. % to 6 wt. % or from 3 wt. % to 5 wt. % of an oxide or sulfide of nickel based on the total weight of the HDS catalyst. The HDS catalyst may have an average surface area of 140 m²/g to 200 m²/g, such as from 140 m²/g to 170 m²/g or from 170 m²/g to 200 m²/g. The HDS catalyst can have a total pore volume of from 0.5 cm³/g to 0.7 cm³/g, such as 0.6 cm³/g. The HDS catalyst may generally have a mesoporous structure having pore sizes in the range of 2 nm to 50 nm, such as from 12 nm to 50 nm.

When the hydrotreating catalysts present in the hydrotreating unit 110 include an HDN catalyst, the HDN catalyst may include a metal oxide or sulfide supported on a support material. The metals of the HDN catalyst may include one or more metals from Groups 5, 6 and 8-10 of the IUPAC periodic table, which may be present as metals, metal oxides, or metal sulfides. In embodiments, the HDN catalyst may contain at least one metal from IUPAC Group 6, such as molybdenum and at least one metal from IUPAC Groups 8-10, such as nickel. The HDN catalyst can also include at least one dopant selected from the group consisting of boron, phosphorus, silicon, halogens, and combinations thereof. In embodiments, cobalt can be used to increase desulfurization of the HDN catalyst. In embodiments, the HDN catalyst may have a higher metals loading for the active phase as compared to the HDM catalyst. This increased metals loading may cause increased catalytic activity. In one or more embodiments, the HDN catalyst comprises nickel (Ni) and molybdenum (Mo), and has a nickel to molybdenum mole ratio (Ni/(Ni+Mo)) of 0.1 to 0.3 (such as from 0.1 to 0.2 or from 0.2 to 0.3). In an embodiment that includes cobalt (Co), the mole ratio of (Co+Ni)/Mo may be in the range of 0.25 to 0.85 (such as from 0.25 to 0.5 or from 0.5 to 0.85).

The support material may include gamma-alumina, mesoporous alumina, silica, or both, in the form of extrudates, spheres, cylinders and pellets. In embodiments, the HDN catalyst may contain a gamma alumina based support that has a surface area of 180 m²/g to 240 m²/g (such as from 180 m²/g to 210 m²/g, or from 210 m²/g to 240 m²/g). This relatively large surface area for the HDN catalyst may allow for a smaller pore volume (for example, less than 1.0 cm³/g, less than 0.95 cm³/g, or even less than 0.9 cm³/g). The HDN catalyst may comprise from 10 wt. % to 18 wt. % of an oxide or sulfide of molybdenum, such as from 13 wt. % to 17 wt. % or from 14 wt. % to 16 wt. % of an oxide or sulfide of molybdenum, based on the total weight of the HDN catalyst. The HDN catalyst may comprise from 2 wt. % to 8 wt. % of an oxide or sulfide of nickel, such as from 3 wt. % to 7 wt. % or from 4 wt. % to 6 wt. % of an oxide or sulfide of nickel, based on the total weight of the HDN catalyst. The HDN catalyst may include from 74 wt. % to 88 wt. % of alumina, such as from 76 wt. % to 84 wt. % or from 78 wt. % to 82 wt. % of alumina, based on the total weight of the HDN catalyst.

When the hydrotreating unit 110 includes a transition reaction zone 115, the transition reaction zone 115 may be operable to remove a quantity of metal components and a quantity of sulfur components from the HDM reaction effluent stream. The transition catalyst may include an alumina-based support in the form of extrudates and at least one metal species supported on the alumina-based support. The metal species may be in the form of metals, metal oxides, or metal sulfides. The metal species of the transition catalyst may include at least one metal from Group 6 and at least one metal from Groups 8-10 of the IUPAC periodic table, which may be in the form of metals, metal oxides, metal sulfides, or combinations of these. Example metals from Group 6 of the IUPAC periodic table include molybdenum and tungsten. Example metals from IUPAC Group 8-10 include nickel and cobalt. For example, the transition catalyst may comprise Mo and Ni on an alumina support (sometimes referred to as "Mo—Ni/Al$_2$O$_3$ catalyst"). The transition catalyst may also contain a dopant that is selected from the group consisting of boron, phosphorus, halogens, silicon, and combinations thereof. The transition catalyst can have a surface area of 140 m²/g to 200 m²/g (such as from 140 m²/g to 170 m²/g or from 170 m²/g to 200 m²/g). The transition catalyst can have an intermediate pore volume of from 0.5 cm³/g to 0.7 cm³/g (such as 0.6 cm³/g). The transition catalyst may generally comprise a mesoporous structure having pore sizes in the range of 12 nm to 50 nm. These characteristics provide a balanced activity in HDM and HDS. The transition catalyst may comprise from 10 wt. % to 18 wt. % of an oxide or sulfide of molybdenum (such as from 11 wt. % to 17 wt. % or from 12 wt. % to 16 wt. % of an oxide or sulfide of molybdenum), from 1 wt. % to 7 wt. % of an oxide or sulfide of nickel (such as from 2 wt. % to 6 wt. % or from 3 wt. % to 5 wt. % of an oxide or sulfide of nickel), and from 75 wt. % to 89 wt. % of alumina (such as from 77 wt. % to 87 wt. % or from 79 wt. % to 85 wt. % of alumina).

When the hydrotreating catalysts present in the hydrotreating unit 110 include an HDA catalyst, the HDA catalyst may include one or more metals from Groups 5, 6, 8, 9, or 10 of the IUPAC periodic table, which may be present as metals, metal oxides, or metal sulfides. The HDA catalyst may include one or more metals from Groups 5 or 6 of the IUPAC periodic table, and one or more metals from Groups 8, 9, or 10 of the IUPAC periodic table. The HDA catalyst may include one or a plurality of molybdenum, tungsten, nickel, cobalt, or combinations of these, which may be present as metals, metal oxides, metal sulfides, or combinations of these. The HDA catalyst may further comprise a support material, such as zeolite, and the metal may be disposed on the support material. In one or more embodiments, the HDA catalyst may comprise tungsten and nickel metal catalyst on a zeolite support that is mesoporous (sometimes referred to as "W—Ni/meso-zeolite catalyst"). In one or more embodiments, the HDA catalyst may comprise molybdenum and nickel metal catalyst on a zeolite support that is mesoporous (sometimes referred to as "Mo—Ni/meso-zeolite catalyst"). The zeolite support material may not be limited to any particular type of zeolite. However, it is contemplated that zeolites such as Y, Beta, AWLZ-15, LZ-45, Y-82, Y-84, LZ-210, LZ-25, Silicalite, or mordenite framework zeolites may be suitable for use in the presently-described HDA catalyst. The support material (that is, the mesoporous zeolite) of the HDA catalyst may be mesoporous, having average pore size of from 2 nm to 50 nm.

The HDA catalyst may include from 18 wt. % to 28 wt. % of a sulfide or oxide of tungsten, such as from 20 wt. % to 27 wt. % or from 22 wt. % to 26 wt. % of tungsten or a sulfide or oxide of tungsten based on the total weight of the HDA catalyst. The HDA catalyst may additionally include, from 2 wt. % to 8 wt. % of an oxide or sulfide of nickel, such as from 3 wt. % to 7 wt. % or from 4 wt. % to 6 wt. % of an oxide or sulfide of nickel based on the total weight of the HDA catalyst. In one or more embodiments, the HDA catalyst may comprise from 12 wt. % to 18 wt. % of an oxide or sulfide of molybdenum, such as from 13 wt. % to 17 wt. % or from 14 wt. % to 16 wt. % of an oxide or sulfide of molybdenum based on the total weight of the HDA catalyst, and from 2 wt. % to 8 wt. % of an oxide or sulfide of nickel, such as from 3 wt. % to 7 wt. % or from 4 wt. % to 6 wt. % of an oxide or sulfide of nickel based on the total weight of the HDA catalyst.

The hydrocarbon feed 102 may be contacted with the hydrotreating catalysts in the hydrotreating unit 110 at a hydrotreating temperature and hydrotreating pressure sufficient to upgrade the hydrocarbon feed 102 to remove one or a plurality of metals, nitrogen compounds, sulfur compounds, aromatic compounds, or combinations of these. The hydrotreating unit 110 may be operated at a hydrotreating temperature of from 300° C. to 450° C., such as from 350° C. to 420° C. The hydrotreating unit 110 may be operated at a hydrotreating pressure of from 50 bar (5,000 kilopascals (kPa)) to 200 bar (20,000 kPa), such as from 130 bar (13,000 kPa) to 160 bar (16,000 kPa). The hydroprocessing unit 110 may operate with a liquid hourly volume space velocity (LHSV) of from 0.1 per hour ($hr^{-1}$) to 1 $hr^{-1}$, such as from 0.2 $hr^{-1}$ to 0.7 $hr^{-1}$. The volume ratio of hydrogen to the hydrocarbon feed 102 introduced to the hydrotreating unit 110 may be from 800:1 to 1200:1. The hydrogen may be introduced to the hydrotreating unit 110 at the inlet of the hydrotreating unit 110. Referring to FIG. 4, in some embodiments, hydrogen may also be introduced to each of the reaction zones, such as the HDM reaction zone 114, the transition reaction zone 115, the HDS reaction zone 116, the HDN reaction zone 117, the HDA reaction zone (not shown), or combinations of these.

Referring again to FIG. 1, the hydrotreated effluent 112 passed out of the hydrotreating unit 110 may have a concentration of one or more of metals, sulfur-containing hydrocarbons, nitrogen-containing hydrocarbons, and aromatic compounds that is less than a concentration of these compounds in the hydrocarbon feed 102 by at least 2 percent (%), at least 5%, at least 10%, at least 25%, at least 50%, or even at least 75%. As previously discussed, contact of the hydrocarbon feed 102 with the hydrotreating catalysts, such as the transition catalyst, HDS catalyst, HDN catalyst, or combinations of these, in the presence of hydrogen in the hydrotreating unit 110 may cause reaction of sulfur-containing hydrocarbons, nitrogen-containing hydrocarbons, or both, in the hydrocarbon feed 102 to remove at least a portion of the sulfur and nitrogen from the hydrocarbons of the hydrocarbon feed 102. The sulfur-containing hydrocarbons may be converted to hydrocarbons and sulfur-containing gases, such as hydrogen sulfide ($H_2S$) for example, and the nitrogen-containing hydrocarbons may be converted to hydrocarbons and nitrogen-containing gases, such as ammonia ($NH_3$). The sulfur-containing gases and nitrogen-containing gases may be removed from the system 100 downstream by the hydrocracked effluent separation system 140. The hydrotreated effluent 112 may have concentration of sulfur-containing hydrocarbons less than a concentration of sulfur-containing hydrocarbons in the hydrocarbon feed 102. The hydrotreated effluent 112 may have a concentration of sulfur-containing hydrocarbons of from 0.01 wt. % to 0.10 wt. %, such as from 0.01 wt. % to 0.08 wt. %, from 0.01 wt. % to 0.05 wt. %, from 0.02 wt. % to 0.10 wt. %, from 0.02 wt. % to 0.08 wt. %, or from 0.02 wt. % to 0.07 wt. % based on the total weight of the hydrotreated effluent 112. The hydrotreated effluent 112 may have a concentration of nitrogen-containing hydrocarbons less than a concentration of nitrogen-containing hydrocarbons in the hydrocarbon feed 102. The hydrotreated effluent 112 may have a concentration of nitrogen-containing hydrocarbons of from 0 parts per million by weight (ppmw) to 500 ppmw, such as from 10 ppmw to 500 ppmw, from 10 ppmw to 400 ppmw, from 10 ppmw to 300 ppmw, from 50 ppmw to 500 ppmw, from 50 ppmw to 400 ppmw, or from 50 ppmw to 300 ppmw based on the total weight of the hydrotreated effluent 112.

Contact of the hydrocarbon feed 102 with the hydrotreating catalysts, such as the HDM catalyst, transition catalyst, or both, in the presence of hydrogen in the hydrotreating unit 110 may operate to remove metals from the hydrocarbons. The hydrotreated effluent 112 may have a metals concentration that is less than the metals concentration of the hydrocarbon feed 102. The hydroprocessed effluent 103 may have a metals concentration of from 0 ppmw to 100 ppmw, such as from 0 ppmw to 75 ppmw, from 0 ppmw to 50 ppmw, from 0 ppmw to 25 ppmw, from 0 ppmw to 10 ppmw, from 0 ppmw to 5 ppmw, from 0.1 ppmw to 100 ppmw, from 0.1 ppmw to 75 ppmw, from 0.1 ppmw to 50 ppmw, from 0.1 ppmw to 25 ppmw, from 0.1 ppmw to 10 ppmw, or from 0.1 ppmw to 5 ppmw based on the total weight of the hydrotreated effluent 112. The hydrotreated effluent 112 may have a nickel concentration that is less than a nickel concentration of the hydrocarbon feed 102, such as a nickel concentration of from 0 ppmw to 10 ppmw, from 0.1 ppmw to 5 ppmw, or from 0.1 ppmw to 1 ppmw based on the total weight of the hydrotreated effluent 112. The hydrotreated effluent 112 may have an arsenic content less than an arsenic content of the hydrocarbon feed 102, such as from 0 ppmw to 1 ppmw, or from 0.01 ppmw to 0.5 ppmw based on the total weight of the hydrotreated effluent 112. The hydrotreated effluent 112 may have a vanadium content less than a vanadium content of the hydrocarbon feed 102, such as from 0 ppmw to 10 ppmw, such as from 01 ppmw to 5 ppmw, or even from 0.1 ppmw to 1 ppmw based on the total weight of the hydrotreated effluent 112.

The hydrotreated effluent 112 may have a concentration of aromatic compounds less than the concentration of aromatic compounds in the hydrocarbon feed 102. The hydrotreated effluent 112 may have a concentration of aromatic compounds of from 5 wt. % to 40 wt. %, such as from 5 wt. % to 30 wt. %, or from 5 wt. % to 20 wt. % based on the total weight of the hydrotreated effluent 112. The hydrotreated effluent 112 may have a concentration of asphaltenes, polyaromatics, and other coke precursors that is less than the concentration of asphaltenes, polyaromatics, and other coke precursors in the hydrocarbon feed 102. The hydrotreated effluent 112 may have a concentration of asphaltenes, polyaromatics, and other coke precursors of from 0.01 wt. % to 1 wt. %, such as from 0.01 wt. % to 0.75 wt. %, or from 0.01 wt. % to 0.50 wt. % based on the total weight of the hydrotreated effluent 112.

Still referring to FIG. 1, at least 20 wt. % of the hydrotreated effluent 112 may have a boiling point temperature of less than or equal to 225° C. In one or more embodiments, at least 5 wt. %, at least 10 wt. %, at least 20 wt. %, or even at least 30 wt. % of the hydrotreated effluent 112 may have a boiling point temperature of less than or equal to 225° C. The hydrotreated effluent 112 may have an initial boiling point (IBP) temperature of less than or equal to 100° C., such as less than or equal to 90° C., less than or equal to 80° C., less than or equal to 70° C., or even less than or equal to 60° C. The hydrotreated effluent 112 may be characterized by a T5 temperature, which is the temperature below which 5% of the constituents boil. The hydrotreated effluent 112 may have a T5 temperature of less than or equal to 150° C., less than or equal to 130° C., less than or equal to 120° C., less than or equal to 110° C., or even less than or equal to 100° C. The hydrotreated effluent 112 may also be characterized by a T95 temperature, which is the temperature at which 95% of the constituents of the hydrotreated effluent 112 boil. In some embodiments, the hydrotreated effluent 112 may have a T95 temperature of greater than or equal to 570° C., greater than or equal to 580° C., greater than or equal to 590° C., greater than or equal to 600° C., or even greater than or equal to 610° C.

The hydrotreated effluent 112 may have a density less than the density of the hydrocarbon feed 102. The hydrotreated effluent 112 may have a density of from 0.80 grams per milliliter (g/mL) to 0.95 g/mL, such as from 0.80 g/mL to 0.90 g/mL, from 0.80 g/mL to 0.85 g/mL, from 0.82 g/mL to 0.95 g/mL, from 0.82 g/mL to 0.90 g/mL, from 0.82 g/mL to 0.85 g/mL, from 0.83 g/mL to 0.95 g/mL, 0.83 g/mL to 0.90 g/mL, or from 0.83 g/mL to 0.85 g/mL. The hydrotreated effluent 112 may have an API gravity greater than the API gravity of the hydrocarbon feed 102 introduced to the hydrotreating unit 110. The hydrotreated effluent 112 may have an API gravity of less than or equal to 50 degrees, or less than or equal to 40 degrees. In some embodiments, the hydrotreated effluent 112 may have an API from 25 degrees to 50 degrees, from 30 degrees to 50 degrees, from 25 degrees to 45 degrees, or from 255 degrees to 40 degrees.

Referring again to FIG. 1, the hydrotreated effluent 112 may be passed to the hydrocracking unit 130, which may be disposed downstream of the hydrotreating unit 110. The hydrocracking unit 130 may be considered the primary hydrocracking unit of system 100. The hydrocracking unit 130 may be operable to contact the hydrotreated effluent 112 with a hydrocracking catalyst in the presence of hydrogen in a hydrocracking zone 132 at reaction conditions sufficient to cause at least a portion of the hydrocarbons in the hydrotreated effluent 112 to undergo hydrocracking to produce a hydrocracked effluent 134 having an increased concentration of hydrocarbons having boiling point temperatures less than or equal to 180° C. compared to the hydrotreated effluent 112. The hydrocracking unit 130 may include at least a hydrocracking catalyst in the hydrocracking zone 132. In the hydrocracking unit 130, saturated polyaromatic compounds and other larger molecular weight hydrocarbons in the hydrotreated effluent 112 may be converted to smaller, lesser-boiling hydrocarbons through contact of the hydrotreated effluent 112 with the hydrocracking catalyst in the presence of hydrogen. The hydrocracking unit 130 may be any type of reactor operable to contact the hydrotreated effluent 112 with the hydrocracking catalyst in the hydrocracking zone 132. Suitable reactors for the hydrocracking unit 130 may include, but are not limited to, fixed bed reactors, moving bed reactors, fluidized bed reactors, plug flow reactors, other types of reactors, or combinations of reactors. For example, the hydrocracking unit 130 may include one or more fixed bed reactors, which may be operated in downflow, upflow, or horizontal flow configurations.

Hydrogen may be introduced to the hydrocracking unit 130 with the hydrotreated effluent 112. The hydrogen introduced to the hydrocracking unit 130 may be recycled hydrogen 143 recovered from the system 100, such as from the hydrocracked effluent separation system 140, the steam cracking unit 160, or both. The hydrogen may also include supplemental hydrogen 104 from an external hydrogen source (not shown). The hydrogen, such as recycled hydrogen 143, supplemental hydrogen 104, or both, may be passed directly to the hydrocracking unit 130 or combined with the hydrotreated effluent 112 upstream of the hydrocracking unit 130.

The hydrocracking catalyst may be a solid particulate catalyst capable of promoting or increasing the reaction rate of cracking reactions of hydrocarbons in the presence of hydrogen. Suitable hydrocracking catalysts may include, but are not limited to, zeolite catalysts. Examples of zeolite catalysts suitable for use as the hydrocracking catalyst may include, but are not limited to, Y-type zeolites, REY-type zeolites, USY-type zeolties, RE-USY-type zeolites, mordenite framework inverted (MFI) type zeolites, beta zeolites, or combinations of these. The hydrocracking catalyst may be a hierarchical zeolite containing hydrocracking catalyst, such as but not limited to a hierarchical beta zeolite, a hierarchical Y-zeolite, or other hierarchical zeolite. Hierarchical zeolites may refer to zeolites that have an average pore size of from 2 nm to 40 nm, or from 5 nm to 25 nm as determined using the Barrett-Joyner-Halinda (BJH) method. Hierarchical zeolites may be prepared by subjecting a microporous beta zeolite or Y-zeolite to a desilication process or by synthesizing the beta zeolite or Y-zeolite using a templating agent or pore-directing agent to achieve the desired hierarchical pore structure.

The hydrocracking catalyst in the hydrocracking unit 130 may additionally include one or a plurality of metals supported on the surfaces of the zeoltites. The hydrocracking catalysts in the hydrocracking unit 130 may include one or a plurality of metals selected from the metallic elements in Groups 6, 7, 8, 9, or 10 of the IUPAC periodic table supported on the zeolite or hierarchical zeolite. Example metals for the hydrocracking catalysts of the hydrocracking unit 130 may include but are not limited to molybdenum, cobalt, tungsten, nickel, platinum, palladium, or combinations of these. In one or more embodiments, the hydrocracking catalyst in the hydrocracking unit 130 may include nickel and molybdenum supported on a Y-zeolite or beta zeolite support. In one or more embodiments, the hydrocracking catalyst in the secondary hydrocracking unit 190 may include nickel and tungsten supported on a Y-zeolite or beta zeolite support. In one or more embodiments, the hydrocracking catalyst in the hydrocracking unit 130 may include platinum and palladium supported on a Y-zeolite or beta zeolite support.

The hydrocracking unit 130 may be operated under conditions sufficient to promote or increase the reaction rate of the hydrocracking reactions to produce the hydrocracked effluent 134 having increased concentrations of smaller, lesser-boiling hydrocarbons, such as but not limited to C2 to C10 paraffins and other hydrocarbons having boiling temperatures less than or equal to 180° C. (naphtha). The hydrotreated effluent 112 may be contacted with the hydrocracking catalyst in the hydrocracking unit 130 at a hydrocracking temperature and hydrocracking pressure sufficient to crack at least a portion of the hydrocarbons, such as but not limited to saturated polyaromatic compounds, in the hydrotreated effluent 112 to produce smaller, lesser-boiling hydrocarbons having boiling point temperatures less than or equal to 180° C. The hydrocracking unit 130 may be operated at a hydrocracking temperature of from 300° C. to 450° C., such as from 350° C. to 420° C. The hydrocracking unit 130 may be operated at a hydrocracking pressure of from 50 bar (5,000 kPa) to 200 bar (20,000 kPa), such as from 130 bar (13,000 kPa) to 160 bar (16,000 kPa). The hydrocracking unit 130 may operate with a liquid hourly volume space velocity (LHSV) of from 0.1 per hour ($hr^{-1}$) to 3 $hr^{-1}$, such as from 0.2 $hr^{-1}$ to 2 $hr^{-1}$. The volume ratio of hydrogen to the hydrotreated effluent 112 introduced to the hydrocracking unit 130 may be from 800:1 to 1200:1. The hydrogen may be introduced to the hydrocracking unit 130 at the inlet of the hydrocracking unit 130.

Referring to FIG. 4, in one or more embodiments, the hydrocracking unit 130 may include at least one supplemental hydrotreating zone 131 upstream of the hydrocracking zone 132. The supplemental hydrotreating zone 131 may include a hydrotreating catalyst, such as any of the hydrotreating catalysts previously described in the present disclosure. For example, in one or more embodiments, the hydrotreating catalyst in the supplemental hydrotreating zone 131 of the hydrocracking unit 130 may be a catalyst comprising nickel and molybdenum or cobalt and molybdenum supported on an alumina catalyst support. The supplemental hydrotreating zone 131 may be disposed in the same reactor as the hydrocracking zone 132 and upstream of the hydrocracking zone 132 or may be disposed in a separate reactor upstream of the reactor comprising the hydrocracking zone 132.

Hydrocracking catalysts may be at least partially deactivated by deposition of contaminants, such as coke or asphaltenes, on the surfaces of the hydrocracking catalyst. As previously discussed, hydrotreating of the hydrocarbon feed 102 in the hydrotreating unit 110 may deconstruct the compounds that stabilize the solution of asphaltenes and other coke precursors in the hydrocarbon feed 102. Upon destruction of the stabilization system, the asphaltenes and other coke precursors may precipitate in the hydrotreated effluent 112. When the hydrotreated effluent 112 is passed to the hydrocracking unit 130 and contacted with the hydrocracking catalyst, the precipitated asphaltenes may deposit on the surfaces of the hydrocracking catalyst. Coke precursors in the hydrotreated effluent 112 may produce coke at the reaction conditions of the hydrocracking reaction, and the coke may also deposit on the surfaces of the hydrocracking catalyst. Thus, the presence of asphaltenes and other coke precursors in the hydrotreated effluent 112 may have a detrimental effect on the service life of the hydrocracking catalyst in the hydrocracking unit 130. Even small amounts of asphaltenes and coke precursors, such as less than 0.5 wt. % in the hydrotreated effluent 112 can cause problems with hydrocracking catalyst deactivation and disrupt smooth steady-state continuous operation of the system 100.

Figure 5:
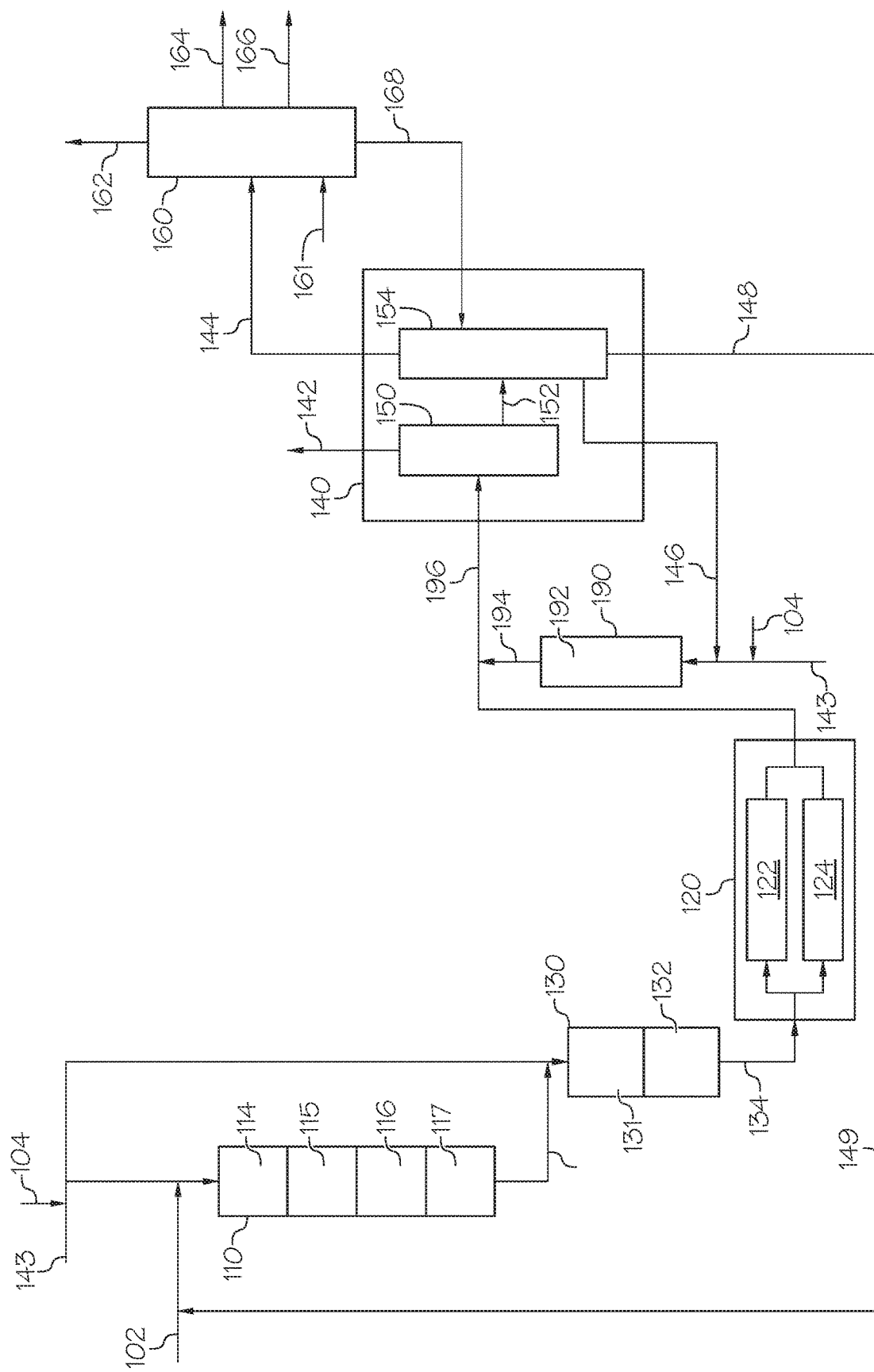
FIG. 5 schematically depicts a generalized flow diagram of yet another embodiment of a system for upgrading heavy oils to olefins, aromatic compounds, or both, according to one or more embodiments shown and described in this disclosure.
Figure 6:
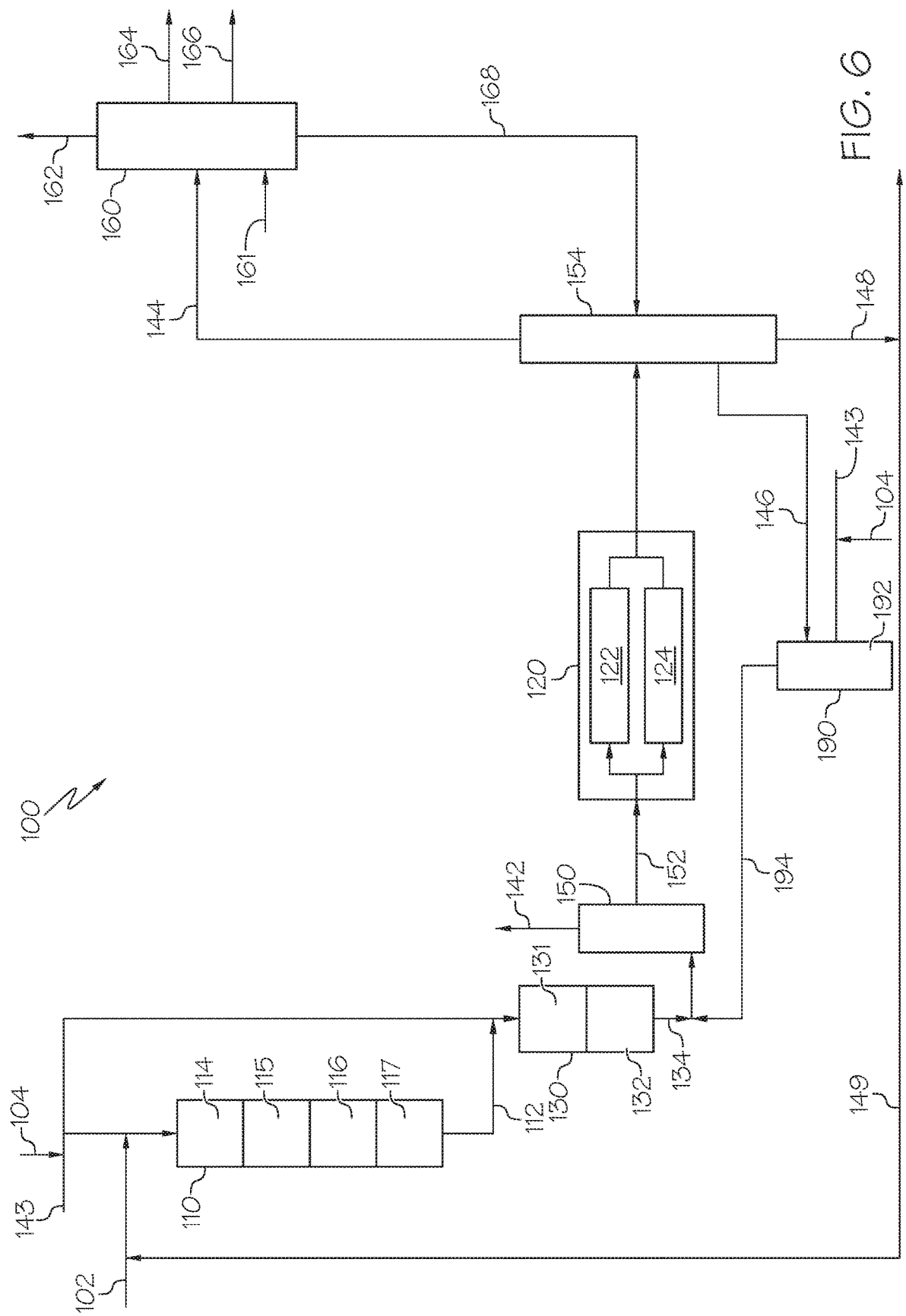
FIG. 6 schematically depicts a generalized flow diagram of still another system for upgrading heavy oils to olefins, aromatic compounds, or both, according to one or more embodiments shown and described in this disclosure.

Referring to FIG. 1, the system 100 may include an adsorption unit 120 operable to remove asphaltenes and other coke precursors from the system. The adsorption unit 120 may be disposed downstream of the hydrotreating unit 110. As shown in FIG. 1, the adsorption unit 120 may be disposed between the hydrotreating unit 110 and the hydrocracking unit 130. Referring to FIGS. 5 and 6, in one or more embodiments, the adsorption unit 120 may be disposed at other positions within the system 100, such as downstream of the hydrocracking unit 130 or between a high pressure separator 150 and a fractionator 154 of the hydrocracked effluent separation system 140 downstream of the hydrocracking unit 130.

Referring again to FIG. 1, the adsorption unit 120 may include a plurality of adsorbent beds or adsorption zones, such as a first adsorption zone 122 and a second adsorption zone 124, which may be arranged in parallel. The adsorption unit 120 is depicted in FIG. 1 as having two adsorption zones for ease of illustration and description. However, the adsorption unit 120 may have greater than or equal to two adsorption zones, such as 2, 3, 4, 5, 6, 7, 8, or more than 8 adsorption zones. Each adsorbent bed may include adsorbent materials capable of selectively adsorbing asphaltenes, coke precursors, or both from a hydrocarbon steam, such as the hydrotreated effluent 112, the hydrocracked effluent 134, or other effluent stream of the system 100. Adsorbent materials suitable for the adsorption unit 120 may include, but are not limited to spherical alumina, clay, metal nanoparticles, or combinations of these. The adsorbent materials may be pelletized. The adsorbent materials may have a pore volume sufficient to allow larger organic molecules, such as asphaltenes to adsorb into the pores. The adsorbent materials may have a total pore volume of greater than or equal to 1.0 milliliters per gram (ml/g), such as greater than or equal to 1.1 ml/g or greater than or equal to 1.5 ml/g. The adsorbent materials may have a total pore volume of from 1.0 ml/g to 3.0 ml/g, such as from 1.1 ml/g to 3.0 ml/g, or even from 1.5 ml/g to 3.0 ml/g.

The adsorbent materials may have an uptake of asphaltene of greater than or equal to 5 grams of asphaltene per gram of adsorbent material, such as from 5 grams to 20 grams of asphaltene per gram of adsorbent material. The uptake of asphaltene for the adsorbent materials may be determined by saturating the adsorbent with asphaltenes. The adsorbent materials may be saturated by monitoring an asphaltene concentration in the effluent exiting the adsorption unit 120. The adsorbent materials may be saturated when the asphaltene concentration in the effluent from the adsorption unit suddenly increases. Once the adsorbent is saturated the adsorption unit may be washed with straight-run diesel for four hours. The adsorbent may then be unloaded from the adsorption unit 120. 100 grams of the saturated adsorbent is weighed out, then washed with toluene and calcined in a furnace maintained at 700° C. for 8 hours with air flow. After calcination, the adsorbent sample is weighed. The uptake of asphaltenes can be calculated as the difference between the initial 100 gram sample of saturated adsorbent and the final weight of the adsorbent after the asphaltenes have all been removed through washing and calcination.

Referring again to FIG. 1, during operation, the hydrotreated effluent 112 may be passed through one or more of the adsorption zones, such as the first adsorption zone 122, the second adsorption zone 124, or both, in which the hydrotreated effluent 112 is contacted with the adsorbent materials. Contact of the hydrotreated effluent 112 with the adsorbent materials in the adsorption unit 120 may cause at least a portion of the asphaltenes, coke precursors, or both, to adsorb into the adsorbent materials. The adsorption unit 120 may be operated at the operating conditions of the unit operation immediately upstream of the adsorption unit 120. When the adsorption unit 120 is positioned immediately downstream of the hydrotreating unit 110 and between the hydrotreating unit 110 and the hydrocracking unit 130, the adsorption unit 120 may be operated at a temperature and pressure similar to the hydrotreating temperature and hydrotreating pressure of the hydrotreating unit 110. In one or more embodiments, the adsorption unit 120 may be operated at a temperature of from 300° C. to 450° C., such as from 350° C. to 420° C. The adsorption unit 120 may be operated at a pressure of from 50 bar (5,000 kPa) to 200 bar (20,000 kPa), such as from 130 bar (13,000 kPa) to 160 bar (16,000 kPa). The adsorption unit 120 may operate with a liquid hourly volume space velocity (LHSV) of from $5\ hr^{-1}$ to $10\ hr^{-1}$.

The hydrotreated effluent 112 passed out of the adsorption unit 120 may have a reduced concentration of asphaltenes and other coke precursors compared to the hydrotreated effluent 112 passed out of the hydrotreating unit 110. The adsorption unit 120 may be operable to remove greater than or equal to 95 percent (%) of the asphaltene from the hydrotreated effluent 112 or other effluent passed through the adsorption unit 120. The adsorption unit 120 may be operable remove greater than or equal to 95% or even greater than or equal to 98% of the asphaltene from the hydrotreated effluent 112 or other effluent passed through the adsorption unit 120. Removal of the asphaltenes, coke precursors, or both from the system 100, such as from the hydrotreated effluent 112, may reduce buildup of asphaltenes, coke, or both, on the surfaces of the hydrocracking catalysts, which may reduce deactivation of the hydrocracking catalyst and improve the service life of the hydrocracking catalysts. Removal of the asphaltenes, coke precursors, or both, may also reduce buildup of asphaltenes, coke, or both on downstream equipment, such as downstream separation units or the steam cracking system 160. Reducing the buildup of asphaltenes and coke on hydrocracking catalysts may reduce deactivation of the hydrocracking catalysts and increase the conversion of hydrocarbons from the hydrocarbon feed 102 to yield hydrocarbons having boiling point temperatures less than or equal to 180° C., which are further processed in the steam cracking system 160 to produce olefins and aromatic compounds. Thus, removal of the asphaltenes and coke precursors by the adsorption unit 120 may increase the yield of olefins and aromatic compounds from the system 100.

The adsorption unit 120 may include a plurality of adsorption zones, such as the first adsorption zone 122, the second adsorption zone 124, and any additional adsorption zones, which may be arranged in parallel. The adsorption unit 120 may be operated in a swing mode in which the hydrotreated effluent 112 or other effluent stream is passed through a first subset of the plurality of adsorbent beds. When the first subset of adsorbent beds becomes saturated with asphaltenes, coke precursors, or both, the flow of effluent through the adsorption unit 120 may be transitioned to a second subset of adsorbent beds to allow the first subset of absorbent beds to be regenerated. For example, in reference to FIG. 1, the hydrotreated effluent 112 may be passed through the first adsorption zone 122 until the adsorbent materials in the first adsorption zone 122 become saturated with asphaltenes, coke precursors, or both, and is no longer effective to remove further asphaltenes from the hydrotreated effluent 112. Flow of the hydrotreated effluent 112 may be transitioned to the second adsorption zone 124 while the first adsorption zone 122 is regenerated.

The adsorbent beds, such as the first adsorption zone 122 and the second adsorption zone 124, may be regenerated by passing a solvent through the adsorbent bed, the solvent being capable of desorbing and dissolving the asphaltene and coke precursors from the adsorbent materials. Suitable solvents for regenerating the adsorbent beds may include, but are not limited to aromatic solvents such as toluene, benzene, or a mixture of both. Other solvents capable of dissolving asphaltenes may also be used to regenerate the adsorbent beds. Other solvents may include alkyl alcohols, halogenated hydrocarbons, aromatic compounds or combinations of these.

Referring again to FIG. 1, the hydrocracked effluent 134 may be passed to the hydrocracked effluent separation system 140. The hydrocracked effluent separation system 140 may be operable to separate the hydrocracked effluent 134 to produce the upgraded lesser-boiling effluent 144, which may be passed to the steam cracking unit 160 as the feed. The hydrocracked effluent separation system 140 may include one or a plurality of separation units, which, collectively, may be operable to separate the hydrocracked effluent 134 into at least light gases 142, the upgraded lesser-boiling effluent 144, and the greater-boiling effluent 148. The hydrocracked effluent separation system 140 may also be operable to produce a middle distillate effluent 146.

The light gases 142 may include but are not limited to excess hydrogen, methane, hydrogen sulfide, ammonia, and other light gases. Light gases may refer to gases in the hydrotreated effluent 112 that are in gaseous form at ambient temperature and pressure. The light gases 142 may include greater than or equal to 95%, greater than or equal to 97%, or even greater than or equal to 99% of the light gases from the hydrocracked effluent 134. The light gases 142 may be passed to a gas treatment plant for further processing, such as removal of hydrogen sulfide gas and ammonia and separation and purification of hydrogen. Hydrogen recovered from the light gases 142 may be recycled back to the hydrotreating unit 110, the hydrocracking unit 130, or both, as at least a portion of the recycled hydrogen 143. The recycled hydrogen 143 may also include hydrogen recovered from the steam cracking system 160.

The upgraded lesser-boiling effluent 144 may include hydrocarbon constituents having a boiling point temperature of less than or equal to 180° C. The upgraded lesser-boiling effluent 144 may include paraffinic compounds, such as alkanes having 2 to 10 carbon atoms (C2-C10 alkanes), and other hydrocarbons having boiling point temperatures less than 180° C., such as alkenes and alkynes with boiling temperatures less than 180° C. The upgraded lesser-boiling effluent 144 may include greater than or equal to 95%, greater than or equal to 97%, or even greater than or equal to 98% of the C2-C10 alkanes from the hydrocracked effluent 134. The upgraded lesser-boiling effluent 144 may be passed from the hydrocracked effluent separation system 140 to the steam cracking system 160 downstream of the hydrocracked effluent separation system 140.

The middle distillate effluent 146 may include constituents of the hydrocracked effluent 134 having a boiling point temperature of from 180° C. to 540° C. The middle distillate effluent 146 may be passed out of the system 100 or recycled back to the hydrotreating unit 110. Referring to FIG. 4, the middle distillate effluent 146 may be passed to a secondary hydrocracking unit 190 for further processing. The secondary hydrocracking unit 190 will be described in further detail subsequently in the present disclosure.

The greater-boiling effluent 148 may include constituents of the hydrocracked effluent 134 having a boiling point temperature greater than or equal to 540° C., such as from 540° C. to 720° C. The greater-boiling effluent 148 may be passed back to the hydrotreating unit 110. The system 100 may include a greater-boiling effluent recycle 149 which may be operative to pass at least a portion of the greater-boiling effluent 148 from the hydrocracked effluent separation system 140 to the hydrotreating unit 110. The portion of the greater-boiling effluent 148 passed back in the greater-boiling effluent recycle 149 may be combined with the hydrocarbon feed 102 upstream of the hydrotreating unit 110 or may be passed directly and independently to the hydrotreating unit 110. Passing at least a portion of or all of the greater-boiling effluent 148 back to the hydrotreating unit 110 may increase the yield of olefins and aromatic compounds from the system 100 by further converting larger hydrocarbons remaining in the greater-boiling effluent 148 to smaller paraffinic hydrocarbons more suitable for processing in the steam cracking system 160.

Figure 2:
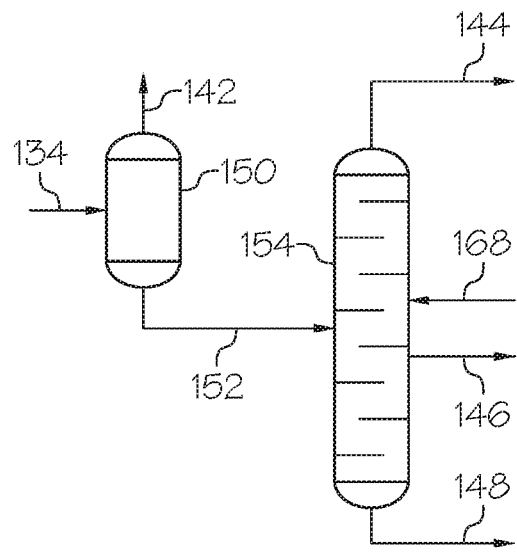
FIG. 2 schematically depicts a generalized flow diagram of a hydrocracked effluent separation system of the system of FIG. 1, according to one or more embodiments shown and described in this disclosure.

Referring to FIG. 2, in one or more embodiments, the hydrocracked effluent separation system 140 may include at least a high pressure separator 150 and a fractionator 154. The high pressure separator 150 may be operable to separate the hydrocracked effluent 134 into the light gases 142 and a high pressure separator liquid effluent 152. The light gases 142 may be passed to a gas treatment plant and the high pressure separator liquid effluent 152 may be passed on to the fractionator 154. The hydrocracked effluent separation system 140 may additionally include a low pressure separator (not shown) downstream of the high pressure separator 150 and disposed between the high pressure separator 150 and the fractionator 154. The low pressure separator may be operable to further separate gaseous constituents from the hydrocracked effluent 134 to produce the high pressure separator liquid effluent 152. The fractionator 154 may be operable to separate the high pressure separator liquid effluent 152 into the upgraded lesser-boiling effluent 144, the middle distillate effluent 146, and the greater-boiling effluent 148. In one or more embodiments, the fractionator 154 may include a fractional distillation column operable to separate the high pressure separator liquid effluent 152 into a plurality of different effluent streams based on differences in boiling point temperatures.

Figure 3:
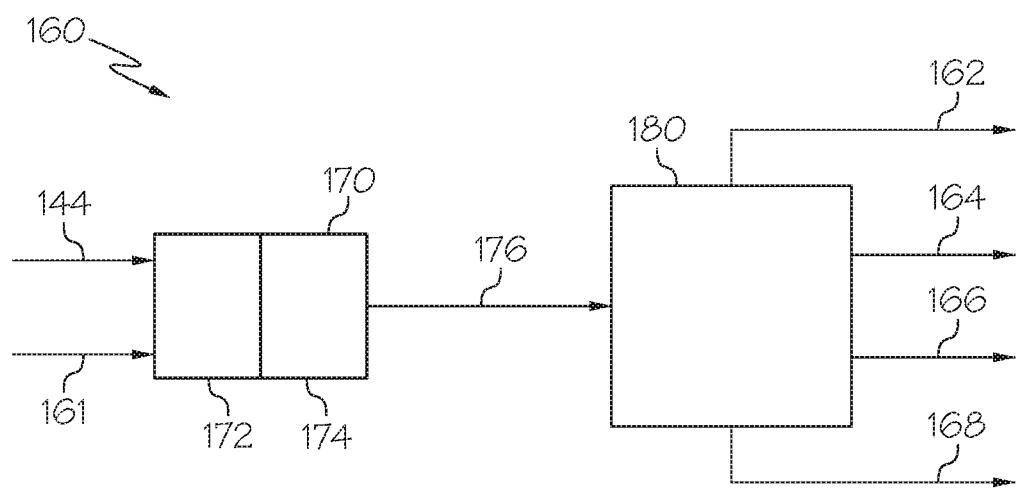
FIG. 3 schematically depicts a generalized flow diagram of a steam cracking system of the system of FIG. 1, according to one or more embodiments shown and described in this disclosure.

As previously discussed, the upgraded lesser-boiling effluent 144 may be passed to the steam cracking system 160. Referring to FIG. 3, the steam cracking system 160 may include a steam cracking unit 170 and a steam cracking effluent separation system 180 downstream of the steam cracking unit 170. The steam cracking unit 170 may be operable to contact the upgraded lesser-boiling effluent 144 with steam 161 at a temperature sufficient to cause at least a portion of the hydrocarbons in the upgraded lesser-boiling effluent 144 to undergo a hydrocracking reaction to produce a steam cracking effluent 176 that includes an increased concentration of olefins, aromatic compounds, or both.

The steam cracking system 160 may include a convection zone 172 and a pyrolysis zone 174. The upgraded lesser-boiling effluent 144 may pass into the convection zone 172 along with steam 161. In the convection zone 172, the upgraded lesser-boiling effluent 144 may be pre-heated to a desired temperature, such as from 400° C. to 650° C. The contents of the upgraded lesser-boiling effluent 144 present in the convection zone 172 may then be passed to the pyrolysis zone 174 where it is steam-cracked to produce the steam cracking effluent 176. The steam cracking effluent 176 may exit the steam cracking system 160 and be passed through a heat exchanger (not shown) where a process fluid, such as water or pyrolysis fuel oil, cools the steam cracking effluent 176. The steam cracking effluent 176 may include a mixture of cracked hydrocarbon-based materials which may be separated into one or more petrochemical products included in one or more system product streams. For example, the steam cracking effluent 176 may include one or more of fuel oil, gasoline, mixed butenes, butadiene, propene, ethylene, methane, hydrogen, aromatic compounds, or other hydrocarbons. The steam cracking effluent 176 may additionally include the water from the stream cracking. The pyrolysis zone 174 may operate at a temperature of from 700° C. to 900° C. The pyrolysis zone 174 may operate with a residence time of from 0.05 seconds to 2 seconds. The mass ratio of steam 161 to the upgraded lesser-boiling effluent 144 may be from about 0.3:1 to about 2:1.

Referring again to FIG. 3, the steam cracking effluent 176 may be passed to the steam cracking effluent separation system 180. The steam cracking effluent separation system 180 may be operable to separate the steam cracking effluent 176 into a plurality of effluent streams, such as but not limited to, a gaseous effluent 162, an olefin effluent 164, an aromatic effluent 166, a pyrolysis oil 168, or combinations of these. The steam cracking effluent separation system 180 may include one or a plurality of separation units, which, collectively, may be operable to separate the steam cracking effluent 176 into one or more of the gaseous effluent 162, the olefin effluent 164, the aromatic effluent 166, the pyrolysis oil 168, or combinations of these.

The gaseous effluent 162 may include light gases, such as excess hydrogen, methane, water vapor, or other light gases. As previously discussed, light gases may refer to gases that are in gaseous form at ambient temperature and pressure. The gaseous effluent 162 may include greater than or equal to 95%, greater than or equal to 97%, or even greater than or equal to 99% of the light gases from the steam cracking effluent 176. The gaseous effluent 162 may be passed to the gas treatment plant for further processing, such as but not limited to separation and purification of hydrogen, recovery of methane and other hydrocarbon gases, or combinations of these. Hydrogen recovered from the gaseous effluent 162 via the gas treatment plant may be recycled back to the hydrotreating unit 110, the hydrocracking unit 130, or both, as a portion of the recycled hydrogen 143. As previously mentioned, the recycled hydrogen 143 may include hydrogen recovered from both the hydrocracked effluent separation system 140 and the steam cracking system 160. In some embodiments, the gaseous effluent 162 and light gases 142 may be passed to the same gas treatment plant to produce the recycled hydrogen 143.

The olefin effluent 164 may include olefins, such as but not limited to, ethene, propene, butenes (1-butene, cis-2-butene, trans-2-butene, isobutene, or combinations of these), pentene, or other olefins and unsaturated compounds. The olefin effluent 164 may include greater than or equal to 50%, greater than or equal to 80%, greater than or equal to 90%, or even greater than or equal to 95% of the C2-C6 olefins from the steam cracking effluent 176. The steam cracking effluent 176 may include other constituents, such as but not limited to saturated hydrocarbons having boiling point temperatures similar to the C2-C6 olefins. The olefin effluent 164 may be passed to one or more processing units downstream of the steam cracking effluent separation system 180 for further separation and purification of the olefins produced in the steam cracking system 160.

The aromatic effluent 166 may include one or more aromatic compounds, such as but not limited to benzene, toluene, xylene (o-xylene, m-xylene, p-xylene, or combinations of these), ethylbenzene, other aromatic compounds, or combinations of aromatic compounds. The aromatic effluent 166 may include greater than or equal to 50%, greater than or equal to 80%, greater than or equal to 90%, or even greater than or equal to 95% of the C6-C8 aromatic compounds (benzene, toluene, xylenes) from the steam cracking effluent 176. The aromatic effluent 166 may be passed out of the system 100 to one or a plurality of processing units downstream of the steam cracking effluent separation system 180 for further separation and purification of the aromatic compounds in the aromatic effluent 166.

The pyrolysis oil 168 may include constituents of the steam cracking effluent 176 having a boiling point temperature greater than or equal to 540° C., such as from 540° C. to 720° C. Referring again to FIG. 1, the pyrolysis oil 168 may be passed back into the system 100 for further conversion of hydrocarbons in the pyrolysis oil 168 to the upgraded lesser-boiling effluent 144. In particular, the pyrolysis oil 168 may be passed back to the hydrocracked effluent separation system 140, such as back to the fractionator 154 (FIG. 4) of the hydrocracked effluent separation system 140, in which the pyrolysis oil 168 may be separated into various constituents and recycled back through various portions of the system 100. At least a portion of the pyrolysis oil 168 may be passed out of the hydrocracked effluent separation system 140 in the greater-boiling effluent 148, which may be passed back to the hydrotreating unit 110 through greater-boiling effluent recycle 149. The greater-boiling effluent 148 may include at least 50%, at least 80%, at least 90%, or at least 95% by weight of the pyrolysis oil 168.

Referring now to FIG. 4, as previously discussed, the middle distillate effluent 146 may be passed from the hydrocracked effluent separation system 140, such as from the fractionator 154 of the hydrocracked effluent separation system 140, to the secondary hydrocracking unit 190. The secondary hydrocracking unit 190 may be operable to contact the middle distillate effluent 146 with a hydrocracking catalyst in the presence of hydrogen in a secondary hydrocracking zone 192 at reaction conditions sufficient to cause at least a portion of the hydrocarbons in the middle distillate effluent 146 to undergo hydrocracking to produce a secondary hydrocracking effluent 194 having an increased concentration of paraffins compared to the middle distillate effluent 146. The secondary hydrocracking unit 190 may further increase the yield of olefins, aromatic compounds, or both, from the hydrocarbon feed 102 using the system 100 by increasing the conversion of larger hydrocarbons passed through to the middle distillate effluent 146 to the upgraded lesser-boiling effluent 144, which can be passed to the steam cracking system 160. Thus, the secondary hydrocracking unit 190 may increase the conversion of the hydrocarbon feed 102 to the upgraded lesser-boiling effluent 144, which can result in further increased yield of olefins, aromatic compounds, or both from the system 100.

The secondary hydrocracking unit 190 may include a hydrocracking catalyst in the secondary hydrocracking zone 192. In the secondary hydrocracking unit 190, larger hydrocarbons, such as but not limited to hydrocarbons having greater than 10 carbon atoms, may be converted to smaller, lesser-boiling hydrocarbons through contact of the middle distillate effluent 146 with the hydrocracking catalyst in the presence of hydrogen. In particular, the larger hydrocarbons in the middle distillate effluent 146 may be converted to hydrocarbons having boiling temperatures of less than or equal to 180° C. The secondary hydrocracking unit 190 may be any type of reactor operable to contact the middle distillate effluent 146 with the hydrocracking catalyst in the secondary hydrocracking zone 192. Suitable reactors for the secondary hydrocracking unit 190 may include, but are not limited to, fixed bed reactors, moving bed reactors, fluidized bed reactors, plug flow reactors, other type of reactor, or combinations of reactors. For example, the secondary hydrocracking unit 190 may include one or more fixed bed reactors, which may be operated in downflow, upflow, or horizontal flow configurations.

Hydrogen may be introduced to the secondary hydrocracking unit 190 along with the middle distillate effluent 146. The hydrogen introduced to the secondary hydrocracking unit 190 may be recycled hydrogen 143 recovered from the system 100, such as from the hydrocracked effluent separation system 140, the steam cracking unit 160, or both. The hydrogen may also include supplemental hydrogen 104 from an external hydrogen source (not shown). The hydrogen, such as recycled hydrogen 143, supplemental hydrogen 104, or both, may be passed directly to the secondary hydrocracking unit 190 or combined with the middle distillate effluent 146 upstream of the secondary hydrocracking unit 190.

Due to removal of the hydrogen sulfide and ammonia gases in the hydrocracked effluent separation system 140, the middle distillate effluent 146 may be substantially free of these gases. As used in the present disclosure, the term "substantially free" of a constituent may refer to a composition, stream, catalyst, or reaction zone having less than 0.1 wt. % of the constituent. For example, the middle distillate effluent 146 that is substantially free of hydrogen sulfide, ammonia, other gases, or combinations of gases, may include less than 0.1 wt. % hydrogen sulfide, ammonia, other gases, or combinations of gases. The middle distillate effluent 146 being substantially free of hydrogen sulfide, ammonia, or both may enable the middle distillate effluent 146 to be processed in the secondary hydrocracking unit 190 under less severe conditions compared to the hydrocracking unit 130. Due to the difference in severity of the hydrocracking reaction in the secondary hydrocracking unit 190 compared to the severity of the hydrocracking reaction in the hydrocracking unit 130, the hydrocracking reaction in the secondary hydrocracking unit 190 may favor hydrogenation and ring-opening of polyaromatic compounds, which may further improve the overall yield of olefins, aromatic compounds, or both, from the system 100.

The hydrocracking catalyst in the secondary hydrocracking unit 190 may be any of the hydrocracking catalysts previously described in relation to the hydrocracking unit 130. The hydrocracking catalyst in the secondary hydrocracking unit 190 may be the same or different than the hydrocracking catalyst disposed in the hydrocracking zone 132 of the hydrocracking unit 130. In some embodiments, the hydrocracking catalyst in the secondary hydrocracking unit 190 may be different from the hydrocracking catalyst in the hydrocracking unit 130, which may be enabled by the difference in the severity of operating conditions of the secondary hydrocracking unit 190 compared to the hydrocracking unit 130. The hydrocracking catalyst in the secondary hydrocracking unit 190 may be a solid particulate catalyst capable of promoting or increasing the reaction rate of cracking reactions of hydrocarbons in the presence of hydrogen. Suitable hydrocracking catalysts may include, but are not limited to, zeolite catalysts. Examples of zeolite catalysts suitable for use as the hydrocracking catalyst may include, but are not limited to, Y-type zeolites, REY-type zeolites, USY-type zeolites, RE-USY-type zeolites, mordenite framework inverted (MFI) type zeolites, beta zeolites, or combinations of these. In one or more embodiments, the hydrocracking catalyst may include a hierarchical zeolite-containing hydrocracking catalyst, such as but not limited to a hierarchical beta zeolite, a hierarchical Y-zeolite, or combinations of these.

The hydrocracking catalyst in the secondary hydrocracking unit 190 may additionally include one or a plurality of metals supported on the surfaces of the zeolites. The hydrocracking catalysts in the secondary hydrocracking unit 190 may include one or a plurality of metals selected from the metallic elements in Groups 6, 7, 8, 9, or 10 of the IUPAC periodic table supported on the zeolite or hierarchical zeolite. Example metals for the hydrocracking catalysts of the secondary hydrocracking unit 190 may include but are not limited to molybdenum, cobalt, tungsten, nickel, platinum, palladium, or combinations of these. In one or more embodiments, the hydrocracking catalyst in the secondary hydrocracking unit 190 may include nickel and molybdenum supported on a Y-zeolite or beta zeolite support. In one or more embodiments, the hydrocracking catalyst in the secondary hydrocracking unit 190 may include nickel and tungsten supported on a Y-zeolite or beta zeolite support. In one or more embodiments, the hydrocracking catalyst in the secondary hydrocracking unit 190 may include platinum and palladium supported on a Y-zeolite or beta zeolite support.

The secondary hydrocracking unit 190 may be operated under conditions sufficient to promote or increase the reaction rate of the hydrocracking reactions to produce the secondary hydrocracking effluent 194 having increased concentrations of smaller, lesser-boiling hydrocarbons, such as but not limited to C2 to C10 paraffins and other hydrocarbons having boiling point temperatures less than 180° C. The middle distillate effluent 146 may be contacted with the hydrocracking catalyst in the secondary hydrocracking unit 190 at a hydrocracking temperature and hydrocracking pressure sufficient to crack at least a portion of the hydrocarbons in the middle distillate effluent 146 to produce smaller, lesser-boiling hydrocarbons, such as paraffins and other hydrocarbons having boiling point temperatures less than or equal to 180° C. The hydrocracking reaction in the secondary hydrocracking unit 190 may be conducted under milder conditions compared to the hydrocracking unit 130 due to the removal of the hydrogen sulfide and ammonia gases in the hydrocracked effluent separation system 140 upstream of the secondary hydrocracking unit 190. The secondary hydrocracking unit 190 may be operated at a hydrocracking temperature of from 300° C. to 400° C., such as from 300° C. to 475° C. The secondary hydrocracking unit 190 may be operated at a hydrocracking pressure of from 50 bar (5,000 kPa) to 200 bar (20,000 kPa), such as from 130 bar (13,000 kPa) to 160 bar (16,000 kPa). The secondary hydrocracking unit 190 may operate with a liquid hourly volume space velocity (LHSV) of from 0.5 per hour ($hr^{-1}$) to 3.0 $hr^{-1}$, such as from 0.6 $hr^{-1}$ to 2.0 $hr^{-1}$. The volume ratio of hydrogen to the hydrocarbons in the middle distillate effluent 146 introduced to the secondary hydrocracking unit 190 may be from 1000:1 to 2000:1. The hydrogen may be introduced to the secondary hydrocracking unit 190 at the inlet of the secondary hydrocracking unit 190 or may be combined with the middle distillate effluent 146 upstream of the secondary hydrocracking unit 190.

Referring to FIG. 4, contacting the middle distillate effluent 146 with the hydrocracking catalyst in the secondary hydrocracking zone 192 of the secondary hydrocracking unit 190 may cause at least a portion of hydrocarbons in the middle distillate effluent 146 to undergo hydrocracking to produce the secondary hydrocracking effluent 194. The secondary hydrocracking effluent 194 may have a greater concentration of hydrocarbons having a boiling point temperature less than or equal to 180° C. compared to the middle distillate effluent 146. The secondary hydrocracking effluent 194 may be passed to the hydrocracked effluent separation system 140 for separation of the lesser boiling constituents into the upgraded lesser-boiling effluent 144 and other effluent streams. The secondary hydrocracking effluent 194 may be combined with the hydrocracked effluent 134 upstream of the hydrocracked effluent separation system 140 to produce a combined hydrocracked effluent 196. Alternatively or additionally, at least a portion of the secondary hydrocracking effluent 194 may be passed directly to the hydrocracked effluent separation system 140, independent of the hydrocracked effluent 134. The hydrocracked effluent separation system 140 may be operable to separate the secondary hydrocracking effluent 194, the hydrocracked effluent 134, or a combination of both, into the light gases 142, the upgraded lesser-boiling effluent 144, the middle distillate effluent 146, and the greater-boiling effluent 148.

Referring to FIG. 4, in operation of the system 100, the hydrocarbon feed 102, the greater-boiling effluent recycle 149, or both, may be passed to the hydrotreating unit 110 along with hydrogen (recycle hydrogen 143, supplemental hydrogen 104, or both). The hydrotreating unit 110 may be operable to hydrotreat the hydrocarbon feed 102 to produce the hydrotreated effluent 112 having reduced concentrations of one or more of sulfur, nitrogen, metals, polyaromatic compounds, or combinations of these. The hydrotreated effluent 112 may be passed directly from the hydrotreating unit 110 to the adsorption unit 120. The adsorption unit 120 may be operable to remove at least a portion of the asphaltenes, coke precursors, or both, from the hydrotreated effluent 112. In some embodiments, the adsorption unit 120 may be operable to remove at least 95% of the asphaltenes from the hydrotreated effluent 112. The hydrotreated effluent 112 may be passed from the adsorption unit 120 to the hydrocracking unit 130, which may be operable to at least hydrocrack at least a portion of the hydrocarbons in the hydrotreated effluent 112 to produce the hydrocracked effluent 134, which may have an increased concentration of hydrocarbons having boiling point temperatures less than 190° C. compared to the hydrotreated effluent 112.

The hydrocracked effluent 134, the secondary hydrocracking effluent 194, or both, may be passed to the hydrocracked effluent separation system 140. The hydrocracked effluent separation system 140 may be operable to separate the hydrocracked effluent 134, secondary hydrocracking effluent 194, or both, into at least the light gases 142, the upgraded lesser-boiling effluent 144, the middle distillate effluent 146, and the greater-boiling effluent 148. The light gases 142 may be passed to a gas treatment plant for recovery of hydrogen, which may be recycled back to the hydrotreating unit 110, the hydrocracking unit 130, or both. The upgraded lesser-boiling effluent 144 may be passed directly to the steam cracking system 160, which may be operable to contact the upgraded lesser-boiling effluent 144 with steam at a temperature sufficient to thermally crack at least a portion of the upgraded lesser-boiling effluent 144 to produce olefins, aromatic compounds, or both. The middle distillate effluent 146 may be passed to the secondary hydrocracking unit 190, which may be operable to contact the middle distillate effluent 146 with a second hydrocracking catalyst to further convert larger hydrocarbons in the middle distillate effluent 146 to hydrocarbons having boiling point temperatures of less than or equal to 180° C. The secondary hydrocracking effluent 194 may be combined with the hydrocracked effluent 134 and passed to the adsorption unit 120 or the secondary hydrocracking effluent 194 may be separately and independently passed to the adsorption unit 120. The greater-boiling effluent 148 may be passed back to the hydrotreating unit 110 for further upgrading of hydrocarbons in the greater-boiling effluent 148 to hydrocarbons having boiling point temperatures of less than or equal to 180° C.

Referring now to FIG. 5, the adsorption unit 120 may be disposed downstream of the hydrocracking unit 130 and between the hydrocracking unit 130 and the hydrocracked effluent separation system 140. An inlet of the adsorption unit 120 may be fluidly coupled to an outlet of the hydrocracking unit 130 so that the hydrocracked effluent 134 can be passed from the hydrocracking unit 130 directly to the adsorption unit 120. The adsorption unit 120 may be operable to remove asphaltenes, other coke precursors, or both, from the hydrocracked effluent 134 before passing the hydrocracked effluent 134 on to the hydrocracked effluent separation system 140. Although not shown in FIG. 5, the secondary hydrocracking effluent 194 from the secondary hydrocracking unit 190 may also be passed to the adsorption unit 120 or combined with the hydrocracked effluent 134 upstream of the adsorption unit 120.

In operation of the system 100 in FIG. 5, the hydrocarbon feed 102, the greater-boiling effluent recycle 149, or both, may be passed to the hydrotreating unit 110 along with hydrogen (recycle hydrogen 143, supplemental hydrogen 104, or both). The hydrotreating unit 110 may be operable to hydrotreat the hydrocarbon feed 102 to produce the hydrotreated effluent 112 having reduced concentrations of one or more of sulfur, nitrogen, metals, polyaromatic compounds, or combinations of these. The hydrotreated effluent 112 may be passed directly from the hydrotreating unit 110 to the hydrocracking unit 130, without passing through any intervening systems or unit operations that change the composition of the hydrotreated effluent 112. The hydrocracking unit 130 may be operable to at least hydrocrack at least a portion of the hydrocarbons in the hydrotreated effluent 112 to produce the hydrocracked effluent 134, which may have an increased concentration of hydrocarbons having boiling point temperatures less than 190° C. compared to the hydrotreated effluent 112. The hydrocracking unit 130 may also include a hydrotreating catalyst and may be operable to further hydrotreat the hydrotreated effluent 112 before contacting the hydrotreated effluent 112 with the hydrocracking catalyst. The hydrocracked effluent 134, the secondary hydrocracking effluent 194, or both, may be passed directly from the hydrocracking unit 130 to the adsorption unit 120. The adsorption unit 120 may be operable to remove at least a portion of the asphaltenes, coke precursors, or both, from the hydrocracked effluent 134, the secondary hydrocracking effluent 194, or both. In some embodiments, the adsorption unit 120 may be operable to remove at least 95% of the asphaltenes from the hydrocracked effluent 134, the secondary hydrocracking effluent 194, or both.

Following the adsorption unit 120, the hydrocracked effluent 134, the secondary hydrocracking effluent 194, or both, may be passed to the hydrocracked effluent separation system 140. The hydrocracked effluent separation system 140 may be operable to separate the hydrocracked effluent 134, secondary hydrocracking effluent 194, or both, into at least the light gases 142, the upgraded lesser-boiling effluent 144, the middle distillate effluent 146, and the greater-boiling effluent 148. The light gases 142 may be passed to a gas treatment plant for recovery of hydrogen, which may be recycled back to the hydrotreating unit 110, the hydrocracking unit 130, or both. The upgraded lesser-boiling effluent 144 may be passed directly to the steam cracking system 160, which may be operable to contact the upgraded lesser-boiling effluent 144 with steam at a temperature sufficient to thermally crack at least a portion of the upgraded lesser-boiling effluent 144 to produce olefins, aromatic compounds, or both. The middle distillate effluent 146 may be passed to the secondary hydrocracking unit 190, which may be operable to contact the middle distillate effluent 146 with a second hydrocracking catalyst to further convert larger hydrocarbons in the middle distillate effluent 146 to hydrocarbons having boiling point temperatures of less than or equal to 180° C. The secondary hydrocracking effluent 194 may be combined with the hydrocracked effluent 134 and passed to the adsorption unit 120 or the secondary hydrocracking effluent 194 may be separately and independently passed to the adsorption unit 120. The greater-boiling effluent 148 may be passed back to the hydrotreating unit 110 for further upgrading of hydrocarbons in the greater-boiling effluent 148 to hydrocarbons having boiling point temperatures of less than or equal to 180° C.

Referring now to FIG. 6, the adsorption unit 120 may be disposed downstream of the hydrocracking unit 130 and between the high pressure separator 150 and the fractionator 154 of the hydrocracked effluent separation system 140. An inlet of the adsorption unit 120 may be fluidly coupled to an outlet of the high pressure separator 150 so that the high pressure separator liquid effluent 152 can be passed from the high pressure separator 150 directly to the adsorption unit 120. The adsorption unit 120 may be operable to remove asphaltenes, other coke precursors, or both, from the high pressure separator liquid effluent 152 before passing the high pressure separator liquid effluent 152 on to the fractionator 154.

In operation of the system 100 depicted in FIG. 6, the hydrocarbon feed 102, the greater-boiling effluent recycle 149, or both, may be passed to the hydrotreating unit 110 along with hydrogen (recycle hydrogen 143, supplemental hydrogen 104, or both). The hydrotreating unit 110 may be operable to hydrotreat the hydrocarbon feed 102 to produce the hydrotreated effluent 112 having reduced concentrations of one or more of sulfur, nitrogen, metals, polyaromatic compounds, or combinations of these. The hydrotreated effluent 112 may be passed directly from the hydrotreating unit 110 to the hydrocracking unit 130, without passing through any intervening systems or unit operations that change the composition of the hydrotreated effluent 112. The hydrocracking unit 130 may be operable to at least hydrocrack at least a portion of the hydrocarbons in the hydrotreated effluent 112 to produce the hydrocracked effluent 134, which may have an increased concentration of hydrocarbons having boiling point temperatures less than 190° C. compared to the hydrotreated effluent 112. The hydrocracking unit 130 may also include a hydrotreating catalyst and may be operable to further hydrotreat the hydrotreated effluent 112 before contacting the hydrotreated effluent 112 with the hydrocracking catalyst. The hydrocracked effluent 134, the secondary hydrocracking effluent 194, or both, may be passed directly from the hydrocracking unit 130 to the high pressure separator 150. The high pressure separator 150 may be operable to separation the hydrocracked effluent 134, secondary hydrocracking effluent 194, or both into the light gases 142 and the high pressure separator liquid effluent 152. The light gases 142 may be passed to a gas treatment plant for recovery of hydrogen, which may be recycled back to the hydrotreating unit 110, the hydrocracking unit 130, or both.

The high pressure separator liquid effluent 152 may be passed directly to the adsorption unit 120. The adsorption unit 120 may be operable to remove at least a portion of the asphaltenes, coke precursors, or both, from the high pressure separator liquid effluent 152. In one or more embodiments, the adsorption unit 120 may be operable to remove at least 95% of the asphaltenes from the high pressure separator liquid effluent 152. Following the adsorption unit 120, the high pressure separator liquid effluent 152 may be passed to the fractionator 154. The fractionator 154 may be operable to separate the high pressure separator liquid effluent 152 into at least the upgraded lesser-boiling effluent 144, the middle distillate effluent 146, and the greater-boiling effluent 148. The upgraded lesser-boiling effluent 144 may be passed directly to the steam cracking system 160, which may be operable to contact the upgraded lesser-boiling effluent 144 with steam at a temperature sufficient to thermally crack at least a portion of the upgraded lesser-boiling effluent 144 to produce olefins, aromatic compounds, or both. The middle distillate effluent 146 may be passed to the secondary hydrocracking unit 190, which may be operable to contact the middle distillate effluent 146 with a second hydrocracking catalyst to further convert larger hydrocarbons in the middle distillate effluent 146 to hydrocarbons having boiling point temperatures of less than or equal to 180° C. The secondary hydrocracking effluent 194 may be combined with the hydrocracked effluent 134 and passed to the high pressure separator 150 or the secondary hydrocracking effluent 194 may be separately and independently passed to the high pressure separator 150. The greater-boiling effluent 148 may be passed back to the hydrotreating unit 110 for further upgrading of hydrocarbons in the greater-boiling effluent 148 to hydrocarbons having boiling point temperatures of less than or equal to 180° C.

Referring again to FIG. 1, a process for processing the hydrocarbon feed 102 may include hydrotreating the hydrocarbon feed 102 to produce the hydrotreated effluent 112, where the hydrotreated effluent 112 may include asphaltenes, coke precursors, or both. The process may further include hydrocracking at least a portion of the hydrotreated effluent 112 to produce a hydrocracked effluent 134. The process may further include adsorbing at least a portion of the asphaltenes, coke precursors, or both, from the hydrotreated effluent 112, the hydrocracked effluent 134, or both, and separating the hydrocracked effluent 134 into at least an upgraded lesser-boiling effluent 144 and a greater-boiling effluent 148. The process may further include steam cracking the upgraded lesser-boiling effluent 144 to produce olefins, aromatic compounds, or combinations of these.

Referring again to FIG. 1, a process for converting the hydrocarbon feed 102 to olefins, aromatic compounds, or combinations of these, according to the present disclosure, may include contacting the hydrocarbon feed 102 with at least one hydrotreating catalyst in the presence of hydrogen in at least one hydrotreating zone 114, 115, 116, 117. The hydrocarbon feed 102 may include a whole crude or desalted whole crude, and the contacting may remove at least one of metals, sulfur compounds, nitrogen compounds, or combinations of these to produce the hydrotreated effluent 112. The process may further include contacting the hydrotreated effluent 112 with a hydrocracking catalyst in the presence of hydrogen, where contacting with the hydrocracking catalyst causes at least a portion of hydrocarbons in the hydrotreated effluent 112 to undergo hydrocracking reactions to produce the hydrocracked effluent 134. The process may further include contacting at least a portion of the hydrotreated effluent 112, at least a portion of the hydrocracked effluent 134, or both with an adsorbent in the adsorption unit 120, where the adsorbent removes at least a portion of asphaltenes, coke precursors, or both, from the hydrotreated effluent 112, the hydrocracked effluent 134, or both. The process may further include passing the hydrocracked effluent 134 to a hydrocracked effluent separation system 140 operable to separate the hydrocracked effluent 134 into at least a upgraded lesser-boiling effluent 144 and a greater boiling effluent 148 and contacting the upgraded lesser-boiling effluent 144 with steam in a steam cracking zone maintained at a steam cracking temperature, where contacting the upgraded lesser-boiling effluent 144 with steam at the steam cracking temperature causes at least a portion of the upgraded lesser-boiling effluent 144 to undergo thermal cracking to produce a steam cracking effluent comprising olefins, aromatic compounds, or both.

While the present description and examples are provided in the context of whole crude oil or desalted crude oil as the hydrocarbon feed 102, it should be understood that systems and processes described in the present disclosure may be applicable for the conversion of a wide variety of heavy oils, including, but not limited to, crude oil, vacuum residue, tar sands, bitumen, atmospheric residue, vacuum gas oils, or other heavy oils.

EXAMPLES

The various embodiments of methods and systems for the processing of heavy oils will be further clarified by the following examples. The examples are illustrative in nature, and should not be understood to limit the subject matter of the present disclosure.

Example 1: Hydrotreating Process for Hydrotreating Whole Crude Oil

In Example 1, crude oil was hydrotreated in a pilot-plant-sized hydrotreating unit comprising an HDM catalyst (commercially available as KFR-22 from Albemarle), a transition catalyst (commercially available as KFR-33 from Albemarle), and an HDS catalyst (commercially available as KFR-70 from Albemarle) to reduce the concentration of metals, sulfur, nitrogen, and aromatic compounds in the crude oil. The hydrotreating unit consisted of a packed column with the HDM catalyst bed on the top, the transition catalyst bed in the middle, and the HDS catalyst bed on the bottom. The volume ratio of the HDM catalyst to the transition catalyst to the HDS catalyst was 15:15:70. For Example 1, the crude oil was Arab light crude oil, the properties of which were previously provided in Table 1. The hydrotreating unit was operated at a temperature of 390° C. and a pressure of 150 bar. The LHSV was increased from 0.2 $h^{-1}$ for run 1A, to 0.3 $h^{-1}$ for run 1B, and to 0.5 $h^{-1}$ for run 1C. The hydrotreated effluents were collected for each of runs 1A, 1B, and 1C from the hydrotreating unit and properties and composition of the hydrotreated effluents were analyzed according to the methods shown in Table 2. These properties included the hydrogen sulfide concentration, the ammonia concentration, the methane concentration (C1), the concentration of hydrocarbons having from 2 to 4 carbon atoms (C2-C4), the concentration of hydrocarbons having greater than 5 carbons and a boiling point temperature less than or equal to 180° C. (C5-180° C.), the concentration of hydrocarbons having boiling point temperatures from 180° C. to 350° C., the concentration of hydrocarbons having boiling point temperatures from 350° C. to 540° C., and the concentration of hydrocarbons having boiling point temperatures greater than 540° C.

TABLE 2

| Property | Method |
|---|---|
| Density | ASTM D287 |
| API | ASTM D287 |
| Carbon Content | ASTM D5291 |
| Hydrogen Content | ASTM D5292 |
| Sulfur Content | ASTM D5453 |
| Nitrogen Content | ASTM D4629 |
| Asphaltenes (Aromatic) Content | ASTM D6560 |
| Micro Carbon Residue (MCR) | ASTM D4530 |
| Metal (V, Ni, As) Content | IP 501 |
| Hg Content | ASTM D7622 |
| SimDis (Boiling Point) | ASTM D7169 |
| PIONA | D5443 |
| Hydrocarbon Structure | NOISE |

Table 3 provides the operating conditions for the hydrotreating process of Example 1 as well as the composition of the hydrotreating effluents recovered from each of runs 1A, 1B, and 1C of Example 1.

TABLE 3

| | Run 1A | Run 1B | Run 1C |
|---|---|---|---|
| Operating Conditions | | | |
| Temperature (° C.) | 390 | 390 | 390 |
| LHSV (h$^{-1}$) | 0.2 | 0.3 | 0.5 |
| Hydrogen consumption (wt. %) | 1.92 | 1.53 | 1.27 |
| Hydrogen consumption (scfb) | 1038 | 827 | 688 |
| Composition (wt. %) | | | |
| Hydrogen Sulfide (H$_2$S) | 2.06 | 2.05 | 2.00 |
| Ammonia (NH$_3$) | 0.1 | 0.08 | 0.05 |
| C1 | 0.35 | 0.27 | 0.21 |
| C2-C4 | 0.88 | 0.28 | 0.05 |
| C5-180° C. | 19.97 | 17.84 | 15.25 |
| 180° C.-350° C. | 44.16 | 38.15 | 38.08 |
| 350° C.-540° C. | 27.35 | 29.50 | 30.43 |
| >540° C. | 7.18 | 13.06 | 15.15 |
| Total Yield C5+ | 98.66 | 98.55 | 98.90 |

Example 2: Hydrocracking the Hydrotreated Effluent of Example 1

In Example 2, the hydrotreated effluent from run 1A of Example 1 was subjected to hydrocracking in a hydrocracking unit. The hydrocracking unit included a hydrotreating zone comprising an HDS catalyst (commercially available as KFR-70 from Albemarle) and a hydrocracking zone downstream of the hydrotreating zone and comprising a hydrocracking catalyst. The hydrocracking catalyst included molybdenum and nickel supported on a hierarchical Y-zeolite. The Y-zeolite had a molar ratio of silica (SiO$_2$) to alumina (Al$_2$O$_3$) of 60:1. The hierarchical Y-zeolite was prepared by treating USY-zeolite with a basic solution (NaOH or ammonia) in the presence of a structure directing agent to convert the USY-zeolite into the hierarchical Y-zeolite. In runs 2A and 2B, the amount of hydrocracking catalyst was 50 wt. % and 30 wt. %, respectively, based on the total weight of HDS and hydrocracking catalyst in the hydrocracking unit. The hydrocracking unit was operated at a temperature of 390° C., a pressure of hydrogen of 150 bar (15,000 kPa), and a LHSV of 1.0 h$^{-1}$. The hydrocracking effluent for each of runs 2A and 2B were collected and analyzed for composition and the results are reported below in Table 4.

TABLE 4

| | Run 2A | Run 2B |
|---|---|---|
| LHSV (h-1) | 1.0 | 1.0 |
| Temperature | 390 | 390 |
| Density (g/cc) | 0.771 | 0.799 |
| Sulfur content (ppmw) | 230 | 287 |
| Nitrogen content (ppmw) | <5 | 3.0 |
| Hydrogen consumption (scfb) | 1006 | 2066 |
| Hydrogen sulfide content (wt. %) | 2.1 | 2.08 |
| Ammonia content (wt. %) | 0.1 | 0.09 |
| C1 content (wt. %) | 0.4 | 0.39 |
| C2 content (wt. %) | 0.6 | 0.48 |
| C3 content (wt. %) | 2.1 | 1.15 |
| nC4 content (wt. %) (normal C4) | 3.8 | 1.34 |
| iC1 content (wt. %) (iso C4) | 2.7 | 1.38 |
| C1-C4 total (wt. %) | 9.6 | 4.74 |
| C5-180° C. (wt. %) | 53.3 | 30.03 |
| 180° C.-350° C. (wt. %) | 31.7 | 45.60 |
| 350° C.-540° C. (wt. %) | 3.2 | 15.18 |
| >540° C. (wt. %) | 0.0 | 4.78 |
| Total C5+ hydrocarbons (wt. %) | 88.1 | 95.58 |

As shown in Table 4, having 50 wt. % hydrocracking catalyst in the hydrocracking unit results in conversion of nearly all of the hydrocarbons having boiling temperatures greater than 350° C. in the hydrotreated effluent into hydrocarbons having boiling temperatures less than 350° C. This in turn increases the amount of hydrocarbons having boiling point temperatures less than or equal to 180° C. in the hydrocracked effluent compared to the hydrotreated effluent.

Example 3: Modeling of System Including Hydrotreating, Hydrocracking, Adsorption, Separation, and Steam Cracking The composition data from Examples 1 and 2 is used to model the process of FIG. 4 for converting a whole crude oil to olefins and aromatic compounds through hydrotreating, hydrocracking, adsorption, separation and steam cracking. The process was modeled using Aspen 6 modeling software. The process modeled in Example 3 is depicted in FIG. 4 and includes the hydrotreating unit 110, which was investigated in Example 1, the adsorption unit 120 downstream of the hydrotreating unit 110, the hydrocracking unit 130, which was investigated in Example 2, the hydrocracked effluent separation system 140, the steam cracking system 160, and the secondary hydrocracking unit 190. The process modeled in Example 3 includes recycling the greater-boiling effluent 148 back to the hydrotreating unit 110, hydrocracking the middle distillate effluent 146 in the secondary hydrocracking unit 190, and passing the pyrolysis oil from the steam cracking system 160 back to the hydrocracked effluent separation system 140.

The modeling of the system 100 in FIG. 4 incorporated the conversion data from the hydrotreating unit evaluated in Example 1 and the hydrocracking unit evaluated in Example 2. Modeling of the system 100 of FIG. 4 resulted in an upgraded lesser-boiling effluent 144 (feed to the steam cracking system) having the composition provided in Table 5.

TABLE 5

| Constituent | Weight Percent (wt. %) |
|---|---|
| C1 | 0.8 |
| C2-C4 Hydrocarbons | 12.0 |
| C5-180° C. Hydrocarbons | 89.2 |

The steam cracking system includes a steam cracking unit operated at a hydrocarbon flow rate of 3600 gallons per hour (flowrate of the upgraded lesser-boiling effluent), a water/steam flow rate of 3600 gallons per hour, a temperature of 840° C., and a pressure of 1.8 bar absolute (180 kPa absolute). The composition for the steam cracking effluent passed out of the steam cracking unit is provided in Table 6.

Comparative Example 4: Modeling of Process with Hydrotreating, Separating, and Steam Cracking Only In Comparative Example 4, a process for converting whole crude oil to olefins and aromatic compounds through hydrotreating, separation, and steam cracking is modeled. The process modeled in Comparative Example 4 includes hydrotreating the whole crude according to the hydrotreating process evaluated in Example 1. In Comparative Example 4, the hydrotreated effluent is passed to the separation system in which the upgraded lesser-boiling effluent is separated out and passed on to the steam cracking system. The process of Comparative Example 4 does not include hydrocracking the hydrotreated effluent, adsorption, the secondary hydrocracking unit 190, or recycling the greater boiling effluent back to the hydrotreating unit. The process of Comparative Example 4 also does not include recycling the pyrolysis oil from the steam cracking system back to the separation system. The process of Comparative Example 4 is described in U.S. Pat. No. 9,255,230.

The hydrotreating unit, separation system, and steam cracking system of Comparative Example 4 are operated under the same operating conditions as the hydrotreating unit, hydrocracked effluent separation system, and steam cracking system of Example 3. The steam cracking system operating conditions and composition of the steam cracking effluent for Comparative Example 4 are provided in Table 6.

Comparative Example 5: Modeling of Process with Hydrotreating, Hydrocracking, Separating, and Steam Cracking In Comparative Example 5, a process for converting whole crude oil to olefins and aromatic compounds through hydrotreating, hydrocracking, separation, and steam cracking is modeled. The process modeled in Comparative Example 5 is the same as the process modeled in Comparative Example 4 with the inclusion of a hydrocracking unit disposed downstream of the hydrotreating unit and upstream of the separation system. The hydrocracking process of Example 2 is used as the hydrocracking unit in Comparative Example 5. Additionally, the hydrotreating process in Comparative Example 5 is the hydrotreating process evaluated in Example 1. The separation unit and steam cracking system are operated under the same conditions as in Example 3 and Comparative Example 4. The process of Comparative Example 5 does not include the adsorption unit, the secondary hydrocracking unit 190, recycling the greater boiling effluent back to the hydrotreating unit, and recycling the pyrolysis oil from the steam cracking system back to the separation system. The steam cracking system operating conditions and composition of the steam cracking effluent for Comparative Example 5 are provided in Table 6.

Example 6: Comparison of Example 3 to Comparative Examples 5 and 6

The compositions of the steam cracking effluents from the processes modeled in Example 3 and Comparative Examples 4 and 5 are provided in the following Table 6. The hydrotreating catalysts and operating conditions of the hydrotreating unit, separation systems, and steam cracking systems are the same for Example 3 and Comparative Examples 5 and 6. The process modeled in Comparative Example 4 includes the hydrotreating unit, the separation system, and steam cracking system. Comparative Example 5 adds the hydrocracking unit downstream of the hydrotreating unit of the process of Comparative Example 4. Example 3 includes the process of FIG. 4, which includes the adsorption unit, the secondary hydrocracking unit, recycling the greater boiling effluent from the separation system back to the hydrotreating unit, and recycling of the pyrolysis oil from the steam cracking system back to the separation system. In other words, Example 3 adds the adsorption unit, secondary hydrocracking unit, greater boiling effluent recycle, and pyrolysis recycle to the process modeled in Comparative Example 5.

TABLE 6

|  | Example 3 | Comp. Ex. 4 | Comp. Ex. 5 |
| --- | --- | --- | --- |
| Steam Cracking Operating Conditions | | | |
| Hydrocarbon flowrate (gallons/minute) | 3600 | 3600 | 3600 |
| Water flowrate (gallons/minute) | 3600 | 3600 | 3600 |
| Temperature (° C.) | 840 | 840 | 840 |
| Pressure (kPa absolute) | 180 | 180 | 180 |
| Olefin Yields (wt. %) | | | |
| Hydrogen | 0.9 | 0.6 | 0.7 |
| Ethylene ($C_2H_4$) | 30.4 | 20.7 | 23.2 |
| Acetylene ($C_2H_2$) | 1.0 | 0.4 | 0.4 |
| Propene ($C_3H_6$) | 16.6 | 10.3 | 11.6 |
| Propadiene ($C_3H_4$) | 0.9 | 0.3 | 0.3 |
| Methylacetylene ($C_3H_4$) | 0.8 | 0.3 | 0.4 |
| 1-Butene | 2.2 | 1.1 | 1.1 |
| trans-2-Butene | 1.0 | 0.3 | 0.4 |
| cis-2-Butene | 0.5 | 0.3 | 0.3 |
| Isobutene | 2.2 | 1.2 | 1.4 |
| 1,3-Butadiene | 6.5 | 3.7 | 4.6 |
| C5+ Yield | | | |
| Benzene | 8.8 | 4.7 | 5.7 |
| Toluene | 8 | 3.8 | 5 |
| Xylenes (para-, meta-, ortho-) | 5.5 | 1.2 | 2.5 |
| Total BTX (benzene, toluene, xylenes) | 22.3 | 9.7 | 13.2 |
| Total C5-C10 | 11.5 | 8.4 | 8.5 |
| C10+ | 3.1 | 18.1 | 19.1 |
| Rate of Coke Formation in Reactor (grams coke/hr) | 0.4 | 0.6 | 0.4 |

As shown by the results in Table 6, the system of the present disclosure modeled in Example 3 produced greater yields of olefins, such as ethylene, propene, and butene, and greater yields of aromatic compounds, such as benzene, toluene, and xylenes, compared to the systems of Comparative Examples 4 and 5. Additionally, the system of Example 3 produced one sixth of the C10+ compounds in the steam cracker effluent compared to the amount of C10+ constituents in the steam cracking effluents produced in the systems of Comparative Examples 4 and 5. Thus, the data presented in Table 6 demonstrate that the system of Example 3 upgrades a greater proportion of hydrocarbons from the crude oil into olefins and aromatic compounds compared to existing processes for upgrading crude oil and other heavy oils.

A first aspect of the present disclosure may include a process for upgrading a hydrocarbon feed. The process may include hydrotreating a hydrocarbon feed to produce a hydrotreated effluent, where the hydrotreated effluent may comprise asphaltenes, coke precursors, or both. The process may further include hydrocracking the at least a portion of the hydrotreated effluent to produce a hydrocracked effluent and adsorbing at least a portion of the asphaltenes, coke precursors, or both, from the hydrotreated effluent, the hydrocracked effluent, or both. The process may further include separating the hydrocracked effluent into at least an upgraded lesser-boiling effluent and a greater-boiling effluent and steam cracking the upgraded lesser-boiling effluent to produce olefins, aromatic compounds, or combinations of these.

A second aspect of the present disclosure may include the first aspect, further comprising combining the greater-boiling effluent with the hydrocarbon feed before hydrotreating the hydrocarbon feed.

A third aspect of the present disclosure may include any one of the first or second aspects, where adsorbing the at least a portion of the asphaltene, coke precursors, or both comprises contacting the hydrotreated effluent with an adsorbent, where contact with the adsorbent causes at least a portion of the asphaltene, coke precursors, or both to adsorb onto the adsorbent.

A fourth aspect of the present disclosure may include any one of the first through third aspects, comprising adsorbing at least 95 percent by weight of the asphaltenes, coke precursors, or both, from the hydrotreated effluent.

A fifth aspect of the present disclosure may include any one of the first through fourth aspects, in which adsorbing the at least a portion of the asphaltenes, coke precursors, or both may reduce deactivation of the hydrocracking catalyst during hydrocracking of the hydrotreated effluent.

A sixth aspect of the present disclosure may include any one of the first through fifth aspects, comprising separating the hydrocracked effluent into the upgraded lesser-boiling effluent, a middle distillate effluent, and the greater-boiling effluent and contacting the middle distillate effluent with a secondary hydrocracking catalyst in the presence of hydrogen to produce a secondary hydrocracked effluent.

A seventh aspect of the present disclosure may include the sixth aspect, further comprising combining the secondary hydrocracked effluent with the hydrocracked effluent to produce a combined hydrocracked effluent and separating the combined hydrocracked effluent into the upgraded lesser-boiling effluent, the middle distillate effluent, and the greater-boiling effluent.

An eighth aspect of the present disclosure may include any one of the first through seventh aspects, further comprising passing the greater-boiling effluent into contact with the hydrocarbon feed and hydrotreating the greater-boiling effluent and the hydrocarbon feed.

A ninth aspect of the present disclosure may include any one of the first through eighth aspects, where hydrotreating may comprise contacting the hydrocarbon feed with at least one hydrotreating catalyst in the presence of hydrogen in at least one hydrotreating zone.

A tenth aspect of the present disclosure may include any one of the first through ninth aspects, where hydrotreating may remove at least one or more metals, nitrogen compounds, sulfur compounds, or combinations of these.

An eleventh aspect of the present disclosure may include any one of the first through tenth aspects, where hydrocracking may comprise contacting the portion of the hydrotreated effluent with a hydrocracking catalyst in the presence of hydrogen to produce the hydrocracked effluent. The hydrocracked effluent may have a greater concentration of hydrocarbons having boiling point temperatures less than or equal to 180° C. compared to the hydrotreated effluent.

A twelfth aspect of the present disclosure may include any one of the first through eleventh aspects, comprising separating a steam cracking effluent into at least one product effluent and a pyrolysis oil effluent, combining the pyrolysis oil effluent with at least a portion of the hydrocracked effluent, and separating the combined pyrolysis oil effluent and hydrocracked effluent into at least the upgraded lesser-boiling effluent and the greater-boiling effluent.

A thirteenth aspect of the present disclosure may include any one of the first through twelfth aspects, where the hydrocarbon feed comprises a whole crude or a de-salted whole crude.

A fourteenth aspect of the present disclosure may be directed to a process for upgrading a hydrocarbon feed. The process may include contacting the hydrocarbon feed with at least one hydrotreating catalyst in the presence of hydrogen in at least one hydrotreating zone. The hydrocarbon feed may comprise whole crude or desalted whole crude and the contacting may remove at least one of metals, sulfur compounds, nitrogen compounds, or combinations of these to produce a hydrotreated effluent. The process may further include contacting the hydrotreated effluent with a hydrocracking catalyst in the presence of hydrogen, where contacting with the hydrocracking catalyst may cause at least a portion of hydrocarbons in the hydrotreated effluent to undergo hydrocracking reactions to produce a hydrocracked effluent. The process may further include contacting at least a portion of the hydrotreated effluent or at least a portion of the hydrocracked effluent with an adsorbent in an adsorption unit. The adsorbent may remove at least a portion of asphaltenes, coke precursors, or both, from the portion of the hydrotreated effluent or the portion of the hydrocracked effluent. The process may further include passing the hydrocracked effluent to a hydrocracked effluent separation system operable to separate the hydrocracked effluent into at least an upgraded lesser-boiling effluent and a greater boiling effluent and contacting the upgraded lesser-boiling effluent with steam in a steam cracking zone maintained at a steam cracking temperature. Contacting the upgraded lesser-boiling effluent with steam at the steam cracking temperature may cause at least a portion of the upgraded lesser-boiling effluent to undergo thermal cracking to produce a steam cracking effluent comprising olefins, aromatic compounds, or both.

A fifteenth aspect of the present disclosure may include the fourteenth aspect, further comprising passing the greater-boiling effluent to the at least one hydrotreating zone.

A sixteenth aspect of the present disclosure may include either one of the fourteenth or fifteenth aspects, in which contacting the hydrotreated effluent or the hydrocracked effluent with the adsorbent in the adsorption unit may remove at least 95 percent by weight of the asphaltenes, coke precursors, or both, from the hydrotreated effluent or the hydrocracked effluent.

A seventeenth aspect of the present disclosure may include any one of the fourteenth through sixteenth aspects, where contacting the hydrotreated effluent or the hydrocracked effluent with the adsorbent in the adsorption unit may reduce deactivation of the hydrocracking catalyst during hydrocracking of the hydrotreated effluent.

An eighteenth aspect of the present disclosure may include any one of the fourteenth through seventeenth aspects, where the hydrocracked effluent may have a greater concentration of hydrocarbons having boiling point temperatures less than or equal to 180° C. compared to the hydrotreated effluent.

A nineteenth aspect of the present disclosure may include any one of the fourteenth through eighteenth aspects, in which the hydrocracked effluent separation system may be operable to separate the hydrocracked effluent into at least the upgraded lesser-boiling effluent, a middle distillate effluent, and the greater-boiling effluent, and the process may further comprise contacting the middle distillate effluent with a secondary hydrocracking catalyst in the presence of hydrogen to produce a secondary hydrocracked effluent.

A twentieth aspect of the present disclosure may include the nineteenth aspect, in which the secondary hydrocracked effluent may have a greater concentration of hydrocarbons having a boiling point temperature less than or equal to 180° C. compared to the middle distillate effluent.

A twenty-first aspect of the present disclosure may include either one of the nineteenth or twentieth aspects, in which the secondary hydrocracking catalyst may comprise at least one metal catalyst supported on Y-zeolite, beta-zeolite, or both.

A twenty-second aspect of the present disclosure may include the twenty-first aspect, in which the metal catalyst may comprise at least one metal selected from the group consisting of cobalt, molybdenum, nickel, platinum, palladium, and combinations of these.

A twenty-third aspect of the present disclosure may include either one of the twenty-first or twenty-second aspects, in which the Y-zeolite, beta-zeolite, or both comprise hierarchical Y-zeolite, hierarchical beta-zeolite, or both, respectively.

A twenty-fourth aspect of the present disclosure may include any one of the nineteenth through twenty-third aspects, further comprising passing the secondary hydrocracked effluent to the hydrocracked effluent separation system.

A twenty-fifth aspect of the present disclosure may include any one of the nineteenth through twenty-fourth aspects, further comprising combining the secondary hydrocracked effluent with the hydrocracked effluent to produce a combined hydrocracked effluent and passing the combined hydrocracked effluent to the hydrocracked effluent separation system.

A twenty-sixth aspect of the present disclosure may include any one of the fourteenth through twenty-fifth aspects, in which the steam cracker effluent may include at least one of ethylene, propylene, butene, or combinations of these.

A twenty-seventh aspect of the present disclosure may include any one of the fourteenth through twenty-sixth aspects, in which the steam cracker effluent may include aromatic compounds that include at least one of benzene, toluene, xylenes, or combinations of these.

A twenty-eighth aspect of the present disclosure may include any one of the fourteenth through twenty-seventh aspects, comprising separating a steam cracking effluent into at least one product effluent and a pyrolysis oil effluent and passing the pyrolysis oil effluent back to the hydrocracked effluent separation system.

A twenty-ninth aspect of the present disclosure may include the twenty-eighth aspect in which the at least one product effluent may comprise at least an olefin effluent comprising one or more olefins and an aromatic effluent comprising one or more aromatic compounds.

A thirtieth aspect of the present disclosure may include any one of the first through twenty-ninth aspects, where the adsorbent may include at least one of spherical alumina, clay, metal nanoparticles, or combinations of these.

A thirty-first aspect of the present disclosure may include any one of the first through thirtieth aspects, further comprising regenerating the adsorbent by contacting the adsorbent with a solvent capable of dissolving asphaltenes, coke precursors, or both.

A thirty-second aspect of the present disclosure may include any one of the first through thirty-first aspects, where the hydrocracking catalyst comprises one or a plurality of metals supported on Y-zeolite, beta zeolite, or both.

A thirty-third aspect of the present disclosure may include the thirty-second aspect, in which the metals of the hydrocracking catalyst may include at least one of cobalt, molybdenum, nickel, platinum, palladium, or combinations of these.

A thirty-fourth aspect of the present disclosure may include the thirty-second aspect, in which the metals of the hydrocracking catalyst may include at least one metal selected from the group consisting of cobalt, molybdenum, nickel, platinum, palladium, or combinations of these.

A thirty-fifth aspect of the present disclosure may include any one of the thirty-second through thirty-fourth aspects, in which the Y-zeolite, beta-zeolite, or both, comprise hierarchical Y-zeolite, hierarchical beta-zeolite, or both, respectively A thirty-sixth aspect of the present disclosure may include a system for processing crude oil. The system may include a hydrotreating unit comprising at least one hydrotreating catalyst. The hydrotreating unit may be operable to contact the crude oil with the at least one hydrotreating catalyst. Contact with the hydrotreating catalyst may upgrade the crude oil to a hydrotreated effluent having a reduced concentration of at least one of nitrogen, sulfur, metals, aromatic compounds, or combinations of these. The system may further include a hydrocracking unit disposed downstream of the hydrotreating unit and comprising a hydrocracking catalyst. The hydrocracking unit may be operable to contact at least a portion of the hydrotreated effluent with the hydrocracking catalyst at conditions sufficient to convert at least a portion of the hydrotreated effluent to produce a hydrocracked effluent comprising hydrocarbons having a boiling point temperature less than or equal to 180° C. The system may further include an adsorption unit downstream of the hydrotreating unit or the hydrocracking unit. The adsorption unit may be operable to contact the hydrotreated effluent or the hydrocracked effluent with an adsorbent capable of adsorbing asphaltenes, coke precursors, or both from the hydrotreated effluent or the hydrocracked effluent. The system may further include a hydrocracked effluent separation system downstream of the hydrocracking unit. The hydrocracked effluent separation system may be operable to separate at least a portion of the hydrocracked effluent into at least an upgraded lesser-boiling effluent and a greater-boiling effluent. The system may further include a steam cracking system downstream of the hydrocracked effluent separation system. The steam cracking system may be operable to convert at least a portion of the upgraded lesser-boiling effluent to produce olefins, aromatic compounds, or both.

A thirty-seventh aspect of the present disclosure may include the thirty-sixth aspect, further comprising a greater-boiling effluent recycle fluidly coupled to the hydrocracked effluent separation system and to the hydrotreating unit. The greater-boiling effluent recycle may be operable to transfer the greater-boiling effluent from the hydrocracked effluent separation system back to the hydrotreating unit.

A thirty-eighth aspect of the present disclosure may include either one of the thirty-sixth or thirty-seventh aspects, in which the hydrocracked effluent separation system may be operable to separate the hydrocracked effluent into at least the upgraded lesser-boiling effluent, the greater-boiling effluent, and a middle distillate effluent, and the system further may comprise a secondary hydrocracking unit that may be operable to contact the middle distillate effluent with a secondary hydrocracking catalyst to produce a secondary hydrocracked effluent.

A thirty-ninth aspect of the present disclosure may include any one of the thirty-sixth through thirty-eighth aspects, further comprising a pyrolysis oil recycle fluidly coupled to the steam cracking system and the hydrocracked effluent separation system. The pyrolysis oil recycle may be operable to transfer a pyrolysis oil effluent from the steam cracking system back to the hydrocracked effluent separation system.

A fortieth aspect of the present disclosure may include any one of the thirty-sixth through thirty-ninth aspects, in which the adsorption unit may be disposed between the hydrotreating unit and the hydrocracking unit.

A forty-first aspect of the present disclosure may include any one of the thirty-sixth through fortieth aspects, in which the adsorption unit may be disposed downstream of the hydrocracking unit.

A forty-second aspect of the present disclosure may include any one of the thirty-sixth through forty-first aspects, in which the adsorption unit may be disposed between the hydrocracking unit and the hydrocracked effluent separation system.

A forty-third aspect of the present disclosure may include any one of the thirty-sixth through forty-second aspects, in which the hydrocracked effluent separation system may comprise at least a high-pressure separator and a fractionator downstream of the high pressure separator.

A forty-fourth aspect of the present disclosure may include the forty-third aspect, in which the adsorption unit may be disposed between the high-pressure separator and the fractionator.

A forty-fifth aspect of the present disclosure may include any one of the thirty-sixth through forty-fourth aspects, in which the adsorption unit may comprise a plurality of adsorption zones in parallel.

A forty-sixth aspect of the present disclosure may include any one of the thirty-sixth through forty-fifth aspects, in which the adsorbent may comprise spherical alumina, clay, metal nanoparticles, or combinations of these.

A forty-seventh aspect of the present disclosure may include any one of the thirty-sixth through forty-sixth aspects, in which the hydrotreating unit comprises a plurality of hydrotreating zones in series.

A forty-eighth aspect of the present disclosure may include any one of the thirty-sixth through forty-seventh aspects, in which the hydrotreating catalyst may comprise at least one of a desulfurization catalyst, a transition catalyst, a denitrogenation catalyst, a demetalization catalyst, a de-aromatization catalyst, or combinations of these.

A forty-ninth aspect of the present disclosure may include any one of the thirty-sixth through forty-eighth aspects, in which the hydrotreating unit may comprise a desulfurization reaction zone comprising a desulfurization catalyst, a transition reaction zone comprising a transition catalyst, and a demetalization reaction zone comprising a demetalization catalyst.

A fiftieth aspect of the present disclosure may include any one of the thirty-sixth through forty-ninth aspects, in which the hydrocracking catalyst comprises a metal supported on a zeolite.

A fifty-first aspect of the present disclosure may include the fiftieth aspect, in which the metal of the hydrocracking catalyst may comprise at least one of cobalt, molybdenum, nickel, platinum, palladium, or combinations of these, and the zeolite comprises hierarchical Y-zeolite, hierarchical beta-zeolite, or both.

A fifty-second aspect of the present disclosure may include any one of the thirty-sixth through fifty-first aspects, in which the hydrocracking unit may comprise a supplemental hydrotreating zone upstream of the hydrocracking zone and comprising a hydrotreating catalyst.

A fifty-third aspect of the present disclosure may include any one of the thirty-sixth through fifty-second aspects, in which the steam cracking system may comprise a steam cracking unit and a steam cracking effluent separation system.

A fifty-fourth aspect of the present disclosure may include the fifty-third aspect, in which the steam cracking unit may be operable to contact the upgraded lesser-boiling effluent with steam at a steam cracking temperature of from 700 degrees Celsius to 900 degrees Celsius produce a steam cracking effluent.

A fifty-fifth aspect of the present disclosure may include either one of the fifty-third or fifty-fourth aspects, in which the steam cracking effluent separation system may be operable to separate the steam cracking effluent into at least one product effluent and a pyrolysis oil effluent.

A fifty-sixth aspect of the present disclosure may include the fifty-fifth aspect, in which the at least one product effluent may comprise at least one olefin effluent, at least one aromatic compound effluent, or both.

It is noted that one or more of the following claims utilize the term "where" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

It should be understood that any two quantitative values assigned to a property may constitute a range of that property, and all combinations of ranges formed from all stated quantitative values of a given property are contemplated in this disclosure.

Having described the subject matter of the present disclosure in detail and by reference to specific embodiments, it is noted that the various details described in this disclosure should not be taken to imply that these details relate to elements that are essential components of the various embodiments described in this disclosure, even in cases where a particular element is illustrated in each of the drawings that accompany the present description. Rather, the claims appended hereto should be taken as the sole representation of the breadth of the present disclosure and the corresponding scope of the various embodiments described in this disclosure. Further, it will be apparent that modifications and variations are possible without departing from the scope of the appended claims.

What is claimed is:
1. A process for upgrading a hydrocarbon feed, the process comprising:

hydrotreating the hydrocarbon feed to produce a hydrotreated effluent, where the hydrotreated effluent comprises asphaltenes, coke precursors, or both;

hydrocracking the at least a portion of the hydrotreated effluent to produce a hydrocracked effluent;

adsorbing at least a portion of the asphaltenes, coke precursors, or both, from the hydrotreated effluent, the hydrocracked effluent, or both;

separating the hydrocracked effluent into at least an upgraded lesser-boiling effluent and a greater-boiling effluent; and contacting the upgraded lesser-boiling effluent with steam at a temperature sufficient to cause hydrocarbons in the upgraded lesser-boiling effluent to react to produce olefins, aromatic compounds, or combinations of these.

2. The process of claim 1, where the hydrocarbon feed comprises a whole crude or a de-salted whole crude.

3. The process of claim 1, where adsorbing the at least a portion of the asphaltene, coke precursors, or both comprises contacting the hydrotreated effluent with an adsorbent, where contact with the adsorbent causes at least a portion of the asphaltene, coke precursors, or both to adsorb onto the adsorbent.

4. The process of claim 3, where the adsorbent includes at least one of spherical alumina, clay, metal nanoparticles, or combinations of these.

5. The process of claim 3, further comprising regenerating the adsorbent by contacting the adsorbent with a solvent capable of dissolving asphaltenes, coke precursors, or both.

6. The process of claim 1, comprising adsorbing at least 95 percent by weight of the asphaltenes, coke precursors, or both, from the hydrotreated effluent.

7. The process of claim 1, comprising:
separating the hydrocracked effluent into the upgraded lesser-boiling effluent, a middle distillate effluent, and the greater-boiling effluent; and contacting the middle distillate effluent with a secondary hydrocracking catalyst in the presence of hydrogen to produce a secondary hydrocracked effluent.

8. The process of claim 7, further comprising combining the secondary hydrocracked effluent with the hydrocracked effluent to produce a combined hydrocracked effluent and separating the combined hydrocracked effluent into the upgraded lesser-boiling effluent, the middle distillate effluent, and the greater-boiling effluent.

9. The process of claim 1, further comprising passing the greater-boiling effluent into contact with the hydrocarbon feed and hydrotreating the greater-boiling effluent and the hydrocarbon feed.

10. The process of claim 1, where hydrotreating comprises contacting the hydrocarbon feed with at least one hydrotreating catalyst in the presence of hydrogen in at least one hydrotreating zone.

11. The process of claim 1, where hydrotreating removes at least one or more metals, nitrogen compounds, sulfur compounds, or combinations of these.

12. The process of claim 1, where hydrocracking comprises contacting the portion of the hydrotreated effluent with a hydrocracking catalyst in the presence of hydrogen to produce the hydrocracked effluent, where the hydrocracked effluent has a greater concentration of hydrocarbons having boiling point temperatures less than or equal to 180° C. compared to the hydrotreated effluent.

13. The process of claim 1, comprising:
separating a steam cracking effluent into at least one product effluent and a pyrolysis oil effluent;
combining the pyrolysis oil effluent with at least a portion of the hydrocracked effluent; and
separating the combined pyrolysis oil effluent and hydrocracked effluent into at least the upgraded lesser-boiling effluent and the greater-boiling effluent.

* * * * *